United States Patent
Diekröger

(10) Patent No.: US 10,024,053 B2
(45) Date of Patent: Jul. 17, 2018

(54) SUPPORT COLUMN SYSTEM FOR SUPPORTING AT LEAST ONE COMPUTER INSTALLATION

(71) Applicant: Bernstein AG, Porta Westfalica (DE)

(72) Inventor: Uwe Diekröger, Petershagen (DE)

(73) Assignee: BERNSTEIN AG, Porta Westfalica (DE)

( * ) Notice: Subject to any disclaimer, the term of this patent is extended or adjusted under 35 U.S.C. 154(b) by 0 days.

(21) Appl. No.: 15/685,091

(22) Filed: Aug. 24, 2017

(65) Prior Publication Data

US 2018/0066428 A1   Mar. 8, 2018

(30) Foreign Application Priority Data

Sep. 8, 2016   (DE) .......................... 10 2016 116 831

(51) Int. Cl.
*E04B 2/82*   (2006.01)

(52) U.S. Cl.
CPC ...................................... *E04B 2/82* (2013.01)

(58) Field of Classification Search
CPC ........... E04B 2/82; A47B 46/00; A47B 21/04; F16M 11/42; F16M 11/10; F16M 11/00; F16M 11/20; H04N 5/28; A47G 29/02; A47G 96/06; A47F 9/08
See application file for complete search history.

(56) References Cited

U.S. PATENT DOCUMENTS

| | | | | |
|---|---|---|---|---|
| 1,933,210 A | * | 10/1933 | Curtis | ...................... A47B 9/00 108/50.14 |
| 4,638,969 A | * | 1/1987 | Brown | ............... F16M 11/2014 248/122.1 |
| 5,126,928 A | * | 6/1992 | Hughes | ................ F16M 11/105 248/124.1 |

(Continued)

FOREIGN PATENT DOCUMENTS

DE   10 2006 019 198 A1   10/2007

*Primary Examiner* — Jeanette E Chapman
(74) *Attorney, Agent, or Firm* — W&C IP

(57) ABSTRACT

The invention relates to a support column system (100) for supporting at least one computer installation (101, 102), wherein the support column system comprises the following:
a) at least one elongate support column (1) which is arranged for vertical fitting;
b) at least one vertical fastening means (7) which is arranged for fastening the support column (1) vertically to a floor, a ceiling, or a wall of a room, or for fastening said support column (1) to a roller platform;
c) at least one first support installation (2) that is fastened to the support column (1), for supporting at least one visual output device (101) of the computer installation;
d) at least one second support installation (3) that is fastened to the support column (1), for supporting at least one manual input device (102) of the computer installation;

Figure 1:
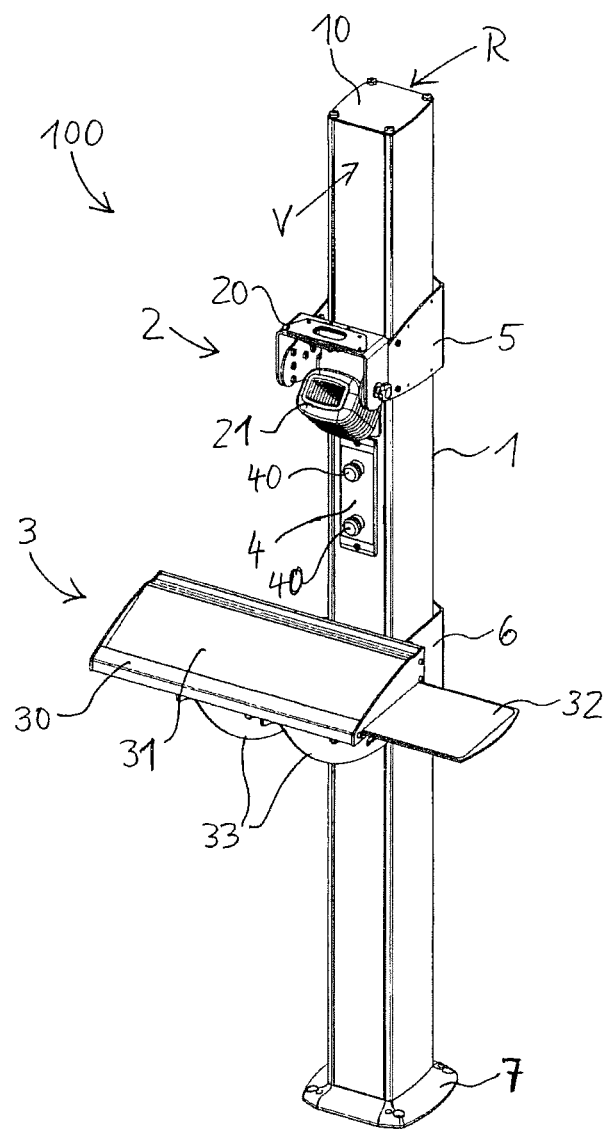

characterized in that the support column (1) has at least one cut-out in an externally accessible wall, and at least one (Continued)

functional element (40) is routed through the cut-out, wherein at least one functional cover plate (4) is fastened in or on the cut-out and covers the cut-out, and the at least one functional element (40) by way of the at least one functional cover plate (4) is routed through the cut-out in a sealed manner.

29 Claims, 21 Drawing Sheets

(56) References Cited

U.S. PATENT DOCUMENTS

| | | | | |
|---|---|---|---|---|
| 5,738,316 A * | 4/1998 | Sweere | ............... | F16M 11/10 248/123.11 |
| 5,918,841 A * | 7/1999 | Sweere | ............... | A47B 21/00 248/123.11 |
| 6,286,794 B1 * | 9/2001 | Harbin | ............... | A47B 21/02 248/123.2 |
| 7,887,014 B2 * | 2/2011 | Lindblad | ............ | F16M 11/10 248/123.11 |
| 8,191,487 B2 | 7/2012 | Theesfeld et al. | | |
| 8,702,049 B2 * | 4/2014 | Vieira | ................ | F16M 11/041 108/108 |
| 9,228,693 B2 * | 1/2016 | Ditges | ................ | F16M 11/24 |
| 9,549,609 B2 * | 1/2017 | Constantino | ........ | F16M 11/42 |
| 2009/0114786 A1 * | 5/2009 | Meyer | ............ | A47B 81/061 248/222.51 |
| 2009/0315287 A1 * | 12/2009 | Rossini | ........... | A61G 12/001 280/47.35 |
| 2010/0019548 A1 * | 1/2010 | Tajbakhsh | ......... | A47B 21/00 297/162 |

* cited by examiner

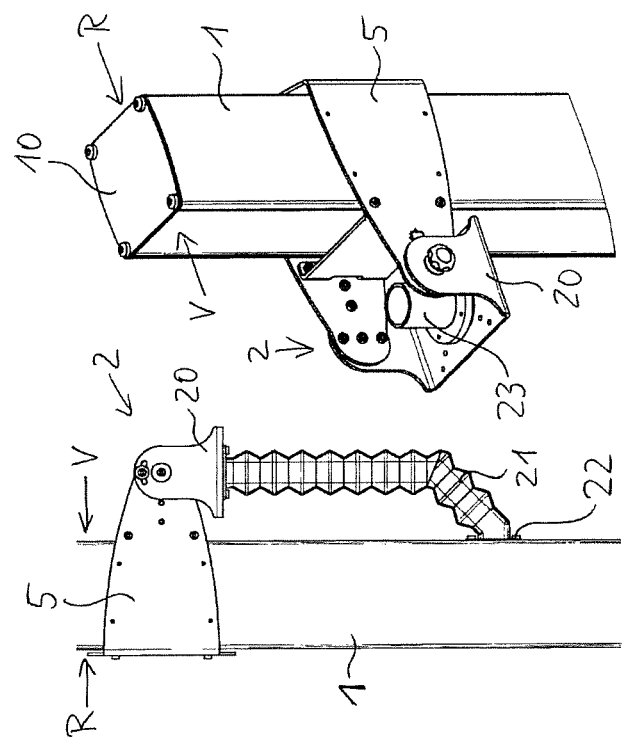
Fig. 4
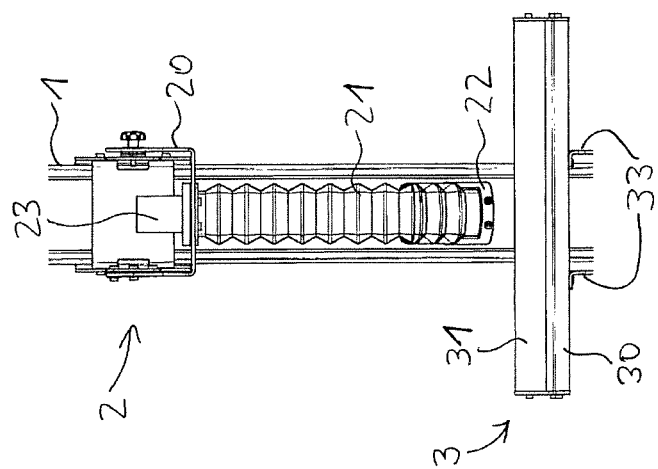
Fig. 3
Fig. 2

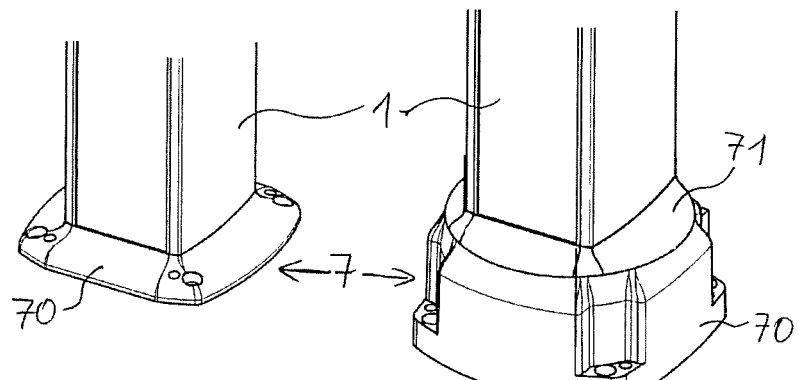
Fig. 35   Fig. 36
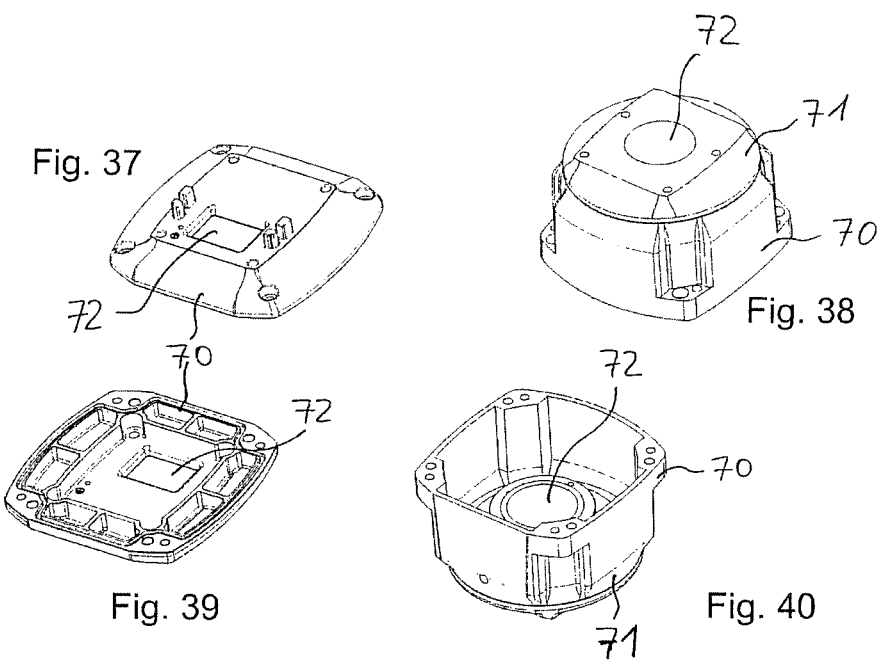
Fig. 37   Fig. 38
Fig. 39   Fig. 40

SUPPORT COLUMN SYSTEM FOR SUPPORTING AT LEAST ONE COMPUTER INSTALLATION

The invention relates to a support column system for supporting at least one computer installation, wherein the support column system comprises the following:
a) at least one elongate support column which is arranged for vertical fitting;
b) at least one vertical fastening means which is arranged for fastening the support column vertically to a floor, a ceiling, or a wall of a room, or for fastening said support column to a roller platform;
c) at least one first support installation that is fastened to the support column, for supporting at least one visual output device of the computer installation;
d) at least one second support installation that is fastened to the support column, for supporting at least one manual input device of the computer installation.

Support column systems for supporting a computer installation are known, for example from U.S. Pat. No. 8,191,487 B2. Such known support column systems do not always meet all requirements for the application in industrial production facilities, in particular in terms of ruggedness, universal functionality, and insensitivity in relation to environmental conditions.

The invention is based on the object of providing a support column system for supporting at least one computer installation which better meets the requirements in the application in industrial production facilities.

This object in the case of a support column system of the type mentioned at the outset is achieved in that the support column has at least one cut-out in an externally accessible wall, and at least one functional element is routed through the cut-out, wherein at least one functional cover plate is fastened in or on the cut-out and covers the cut-out, and the at least one functional element by way of the at least one functional cover plate is routed through the cut-out in a sealed manner. A functional element can be a manual operating element, a visual display element, or a cable, for example. This has the advantage that, apart from the dedicated operating and output elements of the computer installation, an additional functional element can be disposed in a location that is readily accessible to the user of the computer installation. The functional element can moreover be disposed directly on the support column and is thus fastened in a robust and reliable manner. Additional mountings do not have to be disposed on the support column. Moreover, the targeted tightness requirements of the support column system, for example a compliance with the IP65 requirements, can be maintained on account of the sealed arrangement of the functional cover plate on or in the cut-out.

Thus, by attaching a functional cover plate, a manual operating element, a visual display element, or a cable, or a plurality of these elements also in combination with one another, can be fastened as desired directly to the support column at a suitable location. The manual operating element can be a button or a switch, for example, an emergency shut-off activation element, for example, the computer installation or a system that is connected to the computer installation being able to be rapidly switched off in an emergency by activating said activation element. The visual display element can be a signal lamp, for example. The manual operating element can also be configured so as to be combined with a visual display element, in that a signal lamp is integrated in a switch or a button, for example. The parts of the computer installation, such as, for example, the visual output device and/or the manual input device, can be connected without any complex installation of cables on account of the potential for routing a cable or a plurality of cables through the cut-out in the wall of the support column. The cables can be routed in the interior of the support column, for example in a closed chamber of a multi-chamber profile of the support column, up to the upper or the lower end of the support column, in particular up to the vertical fastening means and routed onward from there by way of other paths such as, for example, a cable tunnel or a cable duct in the region of the floor, the ceiling, or a wall.

The functional cover plate can be configured in particular as a replaceable functional cover plate. In this way, the support column can be adapted to other functions and tasks by replacing a functional cover plate.

The functional cover plate can include latching means, for example, latching cams, for example, by way of which the functional cover plate can be fastened to or in the cut-out in a rapid and simple manner. The functional cover plate can additionally have an encircling seal so as to enable the desired seal in relation to the cut-out.

According to one advantageous refinement of the invention, it is provided that the functional cover plate is disposed on a front side or a rear side of the support column. By attaching the functional cover plate to a front side of the support column, attaching manual operating elements which have to be rapidly accessible by an operator, such as the emergency shut-off activation element, for example, is facilitated in particular. Moreover, visual display elements can thus be disposed on the support column in a position where the former can be readily noticed by the user. Attaching the functional cover plate to a rear side of the support column has the advantage that an arrangement of the cables in particular for the installation of the cables is enabled which causes little disturbance to the user and does not disturb the overall visual appeal of the support column system.

According to one advantageous refinement of the invention, it is provided that the functional cover plate has at least one conduit wall, running obliquely to the longitudinal direction of the support column, for routing a cable, or a plurality of conduit walls that are disposed in an oblique staggered manner. The conduit wall, or the conduit walls, thus forms/form allocation faces which can be allocated as desired to one or a plurality of functional elements. The oblique arrangement has the advantage in particular for the installation of cables that the latter do not exit the upright column at a right angle but at a corresponding incline, wherein there is a choice, in particular in the case of a plurality of conduit walls that are disposed in a staggered manner, as to whether the cable is to exit the support column in an oblique upward manner or an oblique downward manner.

The incline of the conduit wall or of the conduit walls can be aligned so as to be at an angle of approximately degrees to the longitudinal axis of the support column, for example. Apart from the regions that are allocated to the conduit walls, the functional cover plate can also have planar surface regions which run so as to be substantially parallel with the longitudinal axis of the support column. Should the functional cover plate not have any such a conduit wall that runs obliquely to the longitudinal axis of the support column, the entire surface of said functional cover plate is configured so as to be planar, for example, so as to be parallel with the longitudinal axis of the support column, for example.

According to one advantageous refinement of the invention it is provided that the functional cover plate has a fastening frame which in terms of the dimensions thereof is adapted to the dimensions of the cut-out. In this way, the functional cover plate fits into the cut-out in a particularly positive manner, this having visual advantages and simplifying the desired seal between the functional cover plate and the cut-out. Thus, an annular seal can be disposed on the functional cover plate, for example, said annular seal running around the fastening frame. In particular, the fastening frame can be configured so as to be integral to the functional cover plate.

According to one advantageous refinement of the invention, it is provided that the support column is composed entirely or largely of metal. A robust support column is provided in this way. In particular, the support column can comprise the multi-chamber profile mentioned. For example, the support column can be provided as profiled extrusion, for example from aluminum.

According to one advantageous refinement of the invention, it is provided that the functional cover plate is composed entirely or largely of plastics. This has the advantage that the functional cover plate can be produced in large volumes in a simple and cost-effective manner, for example by way of plastics injection molding process and/or a casting process. Moreover, the functional cover plate can be readily machined by the user, for example in order to be equipped with the required functional elements.

According to one advantageous refinement of the invention, it is provided that the first and/or the second support installation have/has at least one document stand. This has the advantage that further auxiliary means which are required by the user of the support column system in order for his/her activities to be carried out can be fixed to the support column in a simple manner. In particular, no additional component has to be attached to the support column, since the document stand is already part of the first and/or of the second support installation, or is fastened thereto.

According to one advantageous refinement of the invention, it is provided that an emergency shut-off activation element of the computer installation or of a system that is connected to the computer installation is disposed as the functional element on the functional cover plate. This permits simple and rapid switching-off of the computer installation and/or of the system that is connected thereto.

According to one advantageous refinement of the invention, it is provided that the second support installation has a profiled extrusion having a bearing face for the manual input device of the computer installation, wherein the profiled extrusion is laterally closed by closure plates. The embodiment as a profiled extrusion has the advantage that the second support installation can be provided in different dimensions, depending on requirements and on the length at which a part of the profiled extrusion is severed. In this way, an adaptation of the second support installation to manual input devices, for example computer keyboards, of various widths is possible, for example. A further advantage is that grooves for receiving spring nuts can be incorporated in the profiled extrusion. These grooves can be generated already during the extrusion procedure such that a profiled extrusion that can be universally used is provided, from which a second support installation in which, on account of the grooves available therein, integrated fastening potentials for further elements are available can be produced. The second support installation can be configured so as to be desk-shaped, in particular, such that a keyboard that bears on the second support installation has a certain inclination toward the user.

According to one advantageous refinement of the invention, it is provided that a deployable and stowable mousepad is integrated in the second support installation. This has the advantage that, apart from a computer keyboard, a computer mouse can additionally be stored on the second support installation and at the same time a respective operating face is provided for the computer mouse. On account of the capability of the mousepad for deployment and stowage, the said mousepad can be pulled out only on demand. If said mousepad is not required, it can be stowed such that the second support installation requires less space.

According to one advantageous refinement of the invention, it is provided that, additionally to the visual output device of the computer installation, a signal lamp is fastened to the support column. The signal lamp can be disposed in the upper region of the support column, for example, on top of a cover plate of the support column, in particular. A functional state of the computer installation or of a system that is connected to the computer installation can be displayed by way of the signal lamp, for example.

According to one advantageous refinement of the invention, it is provided that the support column in the cross section is configured as a multi-chamber profile, wherein the multi-chamber profile has at least one closed front chamber and one rear chamber that is open toward a rear side of the support column, wherein the front chamber is separated from the rear chamber by at least one internal separating wall of the multi-chamber profile. This has the advantage that the support column by virtue of the front closed chamber thereof has a high resistance to environmental influences, for example contamination, and is simultaneously very robust in mechanical terms. On account of the closed front chamber, a sealed region that is protected from moisture and which meets the IP65 requirements, for example, can moreover be achieved. Additionally, an open rear chamber which is open toward the rear side of the support column and accordingly offers ready access for attaching mountings or routing cables is present. On account of the opening on the rear side, elements which are disposed in the open chamber of the support column are exposed to the environmental influences to a lesser degree and are moreover noticed to a lesser degree by a user who typically operates the computer installation that is fastened to the support column from the front side, said elements accordingly also not being perceived as disturbing.

Apart from the closed front chamber and the open rear chamber, the multi-chamber profile can have even further chambers. According to one advantageous refinement of the invention, the support column has only these two chambers, specifically the closed front chamber and the open rear chamber. A mechanically robust multi-chamber profile that is nevertheless simple to produce is provided for the support column in this way.

The front side of the support column herein is that side where a user of the computer installation that is fastened to the support column operates said computer installation. Accordingly, the visual output device is typically also oriented substantially toward the front side. The manual input device also points substantially toward the front side of the support column. Accordingly, the rear side of the support column is that side of the support column that faces away from the front side.

For example, the visual output device of the computer installation can be a display screen, for example a flat screen. For example, the manual input device of the computer installation can be a keyboard, a computer mouse, or a similar input device, or a combination of such input devices.

In particular, the computer installation can be configured as an industrial PC (IPC). For example, in the case of such an IPC, the computing unit can be configured integrally in one construction unit with the visual output device, for example a display screen.

According to one advantageous refinement of the invention it is provided that fixing installations for fastening the first and/or the second support installation to the support column are disposed within the rear chamber. This has the advantage that attaching the first and/or the second support installation to the support column can be performed from the rear side of the support column, despite the elements of the computer installation that are supported by the first and/or the second support installation being accessible from the front side of the support column. This fastening of the first and/or of the second support installation at the rear has the advantage that the support column in terms of the external shape thereof can be designed so as to be relatively smooth and planar both on the front side as well as on the sides, since by contrast to U.S. Pat. No. 8,191,487 B2 no guide rails or other fastening means on the front side or on the sides are required for fastening the first and/or the second support installation. Also, it is not necessary for the closed front chamber of the support column to be drilled in order to provide fastening bores for attaching the first and/or the second support installation. Rather, the fixing installations prepared within the rear chamber can be used therefor.

Depending on the embodiment of the mounting used for attaching the first and/or the second support installation, and on the fastening means used, the fixing installations within the rear chamber can be configured differently, for example in the form of bores, of grooves, for example grooves for receiving spring nuts, or of guide rails or of other guide profiles for receiving mountings that are adjustable in a longitudinally displaceable manner. A combination of a plurality of fixing installations can also be advantageously provided.

A nut into which a screw can be screw-fitted, wherein the nut is coupled to an expansion spring, is referred to as a spring nut. If the nut having the expansion spring is plug-fitted in a fixing installation that is configured as a groove, for example in the rear chamber, the nut is held in the groove by the expansion spring which has the tendency to expand.

According to one advantageous refinement of the invention, it is provided that the first support installation is fastened to the support column by means of a first mounting, and/or the second support installation is fastened to the support column by means of a second mounting. The first support installation can thus be fastened to the support column in particular by means of a first mounting which is configured as a component that is separate from the second mounting. Accordingly, the loads to be supported can be distributed across respective mountings that are adapted to the load requirement. The first mounting can be configured as a VESA mounting, for example.

According to one advantageous refinement of the invention, it is provided that the first and/or the second mounting encompass/encompasses the support column on both sides. Accordingly, on account of the first and/or the second mounting, the support installation that is in each case fastened to either of the former can be disposed so as to be substantially on the front side of the support column, while, as a result of the support column being encompassed by respective lateral holding arms of the first and/or the second mounting that are routed past the support column, this mounting can be fastened to the support column from the rear side in that the holding arms of the respective mounting are routed to the fixing installations in the rear chamber. This permits robust fastening of the first and/or of the second support installation to the support column, without disturbing the positive visual appeal of the support column system. The first and/or the second mounting herein can be configured in such a manner that said mounting in relation to the support column is not rotatable about the longitudinal axis of the support column. Should an adjustability of the position of the first support installation or of the second support installation nevertheless be possible in a rotation axis that is parallel with the longitudinal axis of the support column, the first and/or the second support installation can be connected to the respective mounting by means of a joint, for example. The first and/or the second mounting can additionally permit an adjustability of the first or second support installation that is fastened to the former about a horizontally running axis, for example in order for the inclination of a display screen of the computer installation to be adapted as desired.

According to one advantageous refinement of the invention, it is provided that the first mounting and the second mounting are height adjustable in a mutually separate manner. A particularly flexible adaptation of the vertical position of the input and output devices of the computer installation to the requirements of a user is possible in this way; in particular, an adaptation to an operation of the computer installation in a sitting or standing position of the user is possible.

The height adjustment of the first and/or of the second mounting on the support column can be performed for example by longitudinally displacing the respective mounting on the support column. Herein, longitudinally displacing means a displacement in the direction of the vertical longitudinal axis of the support column. To this end, a sliding installation (slider) can be provided, for example, a slider which is attached to the outside of the support column, for example. Fixing means, for example a respective clamp-fixing mechanism which permits rapid fixing by clamping the respective mounting in the desired vertical position on the support column, can be provided in order for the first mounting or the second mounting, respectively, to be secured in a desired and adjusted vertical position. The clamp-fixing mechanism can be configured as a part of the slider.

According to one advantageous refinement of the invention, it is provided that a receptacle space for a coupling element that is fastenable within the rear chamber is disposed in the rear chamber, said coupling element being configured as a separate component or as a part of the first or the second mounting and being arranged for fastening the first or the second support installation to the support column. This has the advantage that attaching the first and/or the second mounting to the fixing installations of the rear chamber is simplified. The coupling element as a separate component can thus be fastened first in the receptacle space of the rear chamber. The first or the second mounting can then be fastened to this coupling element.

According to one advantageous refinement of the invention, it is provided that a cable receptacle space for receiving cables that are installed in the rear chamber is disposed in the rear chamber between the receptacle space and the internal separating wall. In this way, cables can be additionally installed in the rear chamber without the attaching of the first or of the second mounting in the rear chamber of the support column being impeded or disturbed. A modification of the vertical position of the aforementioned coupling element in the receptacle space is also readily possible, even in the case of cables that have already been installed in the cable receptacle space. Connection cables of the visual output device of the computer installation, cables of the manual input device, or other cables of the computer installation can thus be installed in the cable receptacle space, for example. The cables can be routed out of the rear chamber at a desired location and be routed externally about the support column to the output device or the input device of the computer installation. It can be avoided in particular on account thereof that cables are installed in a crisscross manner outside or along the support column.

According to one advantageous refinement of the invention, it is provided that a guide profile for a coupling element that is fastenable so as to be longitudinally displaceable within the rear chamber is disposed in the rear chamber, the coupling element being guided so as to be displaceable in the longitudinal direction of the support column in a substantially clearance-free manner by said guide profile. The coupling element that is fastenable in a longitudinally displaceable manner can be configured in particular as a sliding element, that is to say as a slider which can slide along in the guide profile and in this way be moved to a desired vertical position. The guide profile herein can be configured in the manner of guide rails, for example, in which the coupling element is guided in a sliding manner. The guide profile can be disposed in the receptacle space, in particular.

The slider is arranged for fastening the first or the second support installation to the support column. This can be performed in such a manner, for example, that the first or the second mounting is fastened to the slider, and the respective first or second support installation is fastened to this mounting. A simple adjustability of the vertical position of the support installation that is fastened to the slider is possible by means of the slider in this instance.

According to one advantageous refinement of the invention, it is provided that a coupling element, for example the aforementioned slider, which has a clamp-fixing mechanism by way of which the coupling element within the rear chamber is fixedly clampable in the guide profile and thus fixable in relation to a displacement in the longitudinal direction of the support column is disposed in the rear chamber. On account of such a clamp-fixing mechanism, a simple and rapid fixability of the coupling element in relation to longitudinal displacement is implementable. The fixation can also be released again rapidly such that the coupling element and accordingly the support installation that is fastened thereto by way of a mounting can be adjusted in a simple and rapid manner in relation to the vertical position of a support column. The clamp-fixing mechanism can be configured in such a manner, for example, that a part of the coupling element that is guided in the guide profile is expanded by tightening a clamping screw, and clamping of the coupling element within the guide profile is implemented on account thereof.

According to one advantageous refinement of the invention, it is provided that grooves that for receiving spring nuts run in the longitudinal direction of the support column are disposed in the rear chamber. Fixing installations for fastening the first and/or the second support installation to the support column can be implemented with simple means in this way, said fixing means permitting the user great flexibility in attaching and positioning the first and the second support installation. Moreover, the grooves can be utilized for fastening further elements to the support column.

According to one advantageous refinement of the invention, it is provided that the support column in the region of the rear chamber has grooves for receiving flexible closure strips which are arranged for visually covering the rear chamber toward the rear side, while simultaneously providing a potential conduit for cables. This permits the rear open chamber to be closed off at least in visual terms, without restricting the potential for attaching mountings or conduits for cables. Such flexible closure strips can be implemented by bristle strips, foam strips, textile strips, or rubber seals, for example.

According to one advantageous refinement of the invention, it is provided that the vertical fastening means has at least one rotary joint by way of which the support column is mounted in the space so as to be rotatable about the longitudinal axis of said support column. This has the advantage that the support column in its entirety can be rotated about the longitudinal axis thereof; that is to say that in the case of a rotation of the support column, the first support installation and the second support installation that are fastened to said support column are conjointly moved such that a user does not have to rotate separately both support installations and optionally further elements.

According to one advantageous refinement of the invention, it is provided that a bellows is coupled to a cut-out on an external wall of the support column, on the one hand, and to the first or the second support installation or to the first or the second mounting, on the other hand. On account thereof, an additional potential for connection cables of the visual output device or of the manual input device to be routed in an additionally protected manner along the support column and into the interior of the support column is achieved. In the case of an accordingly sealed attachment to the cut-out on the external wall of the support column, a good protection from environmental influences can be furthermore guaranteed on account of the bellows. In particular, the IP65 conformity of the support column can be maintained. On account of the configuration as a bellows, a height adjustment of the first support installation or of the second support installation, respectively, is furthermore possible.

According to one advantageous refinement of the invention, the first support installation and/or the second support installation are/is fastened to the support column so as to be longitudinally displaceable and are/is coupled to the support column by way of a damper installation, wherein the damper installation decelerates and/or damps a longitudinal displacement movement of the respective support installation in relation to the support column. The damper installation can be configured as a gas pressure spring, for example, or a similar spring installation. The respective support installation is height adjustable at all times in this way, without fixing means having to be released first. Moreover, a respective adjusted height setting is maintained by the damper installation.

According to one advantageous refinement of the invention, it is provided that the support column system has a cable routing installation which has a plurality of cable routing portions which reach laterally around the support column, from the rear side to the front side of the support column. The cable routing installation can be fastened directly to the support column, or indirectly in that the cable routing installation is fastened to the first or to the second support installation. The cable routing installation can have at least two interconnectable parts that are placeable laterally onto the support column.

The invention will be explained in more detail hereunder by means of exemplary embodiments, using drawings in which:

FIG. 1 shows a support column system in a perspective illustration; and

Figures 5, 6, 7:
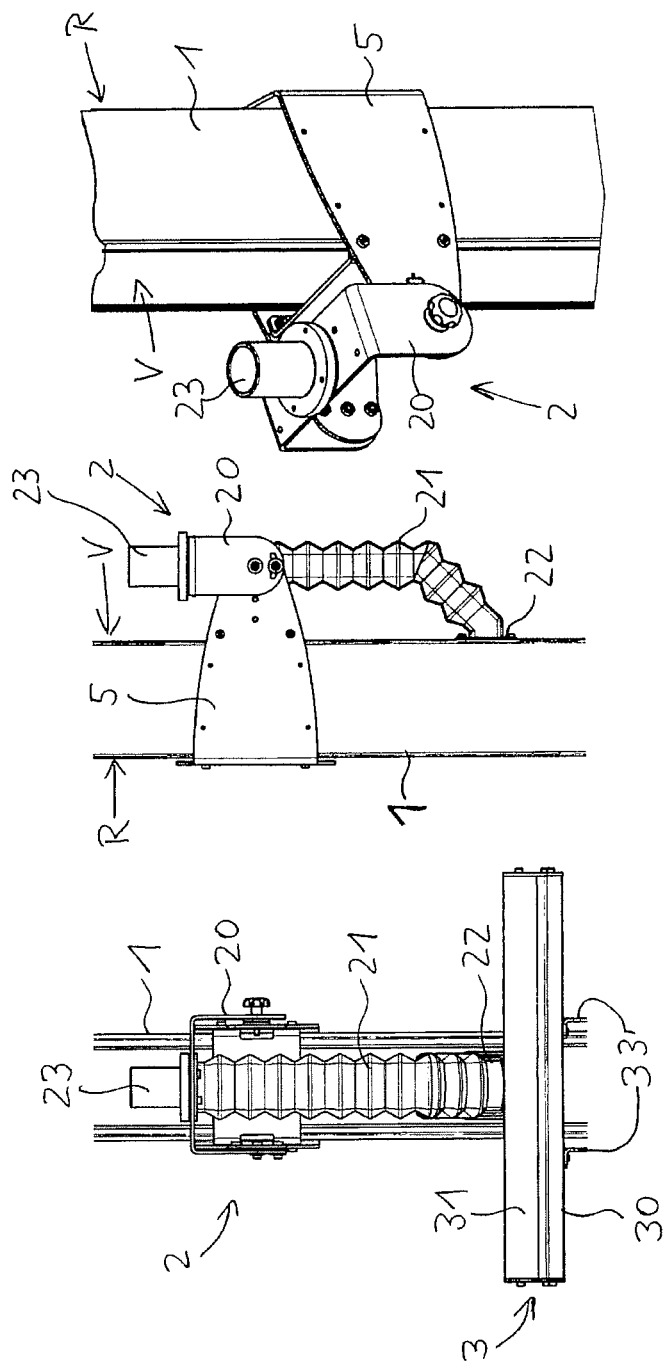
Figures 8, 9:
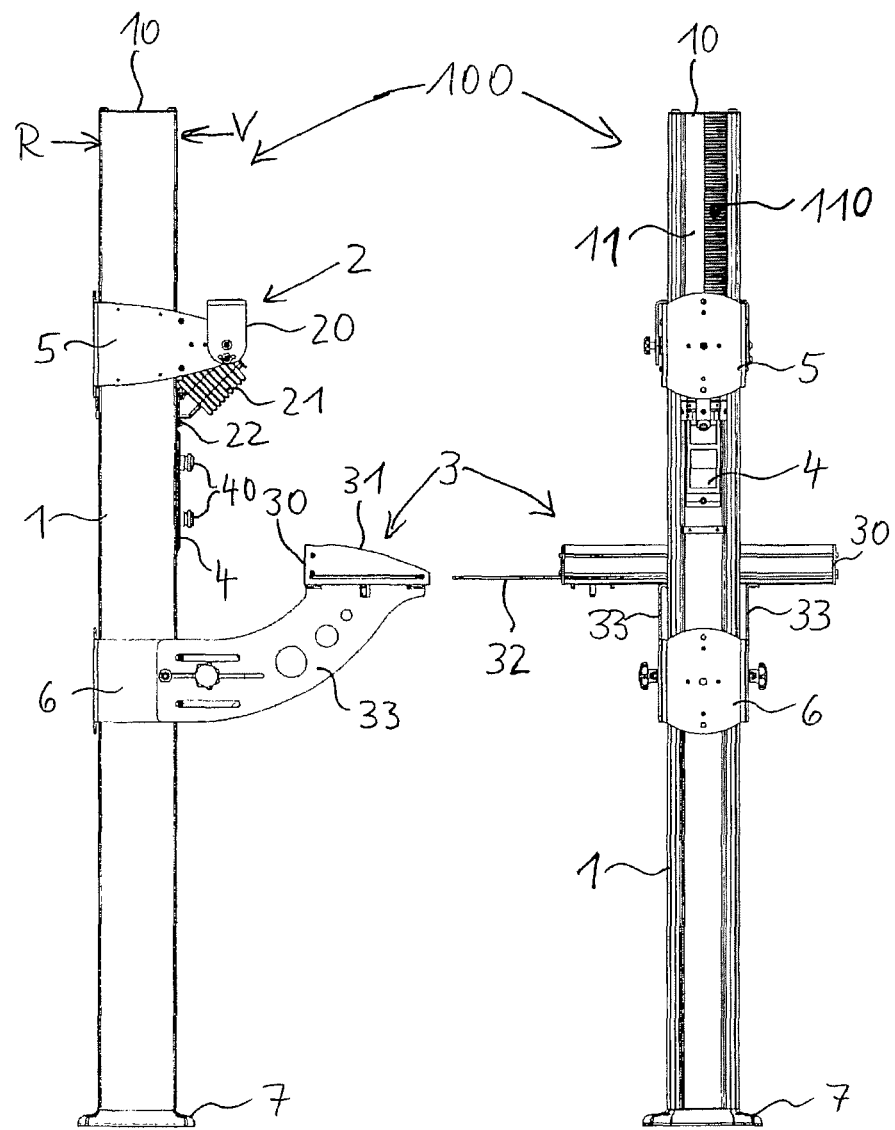
Figures 10, 11:
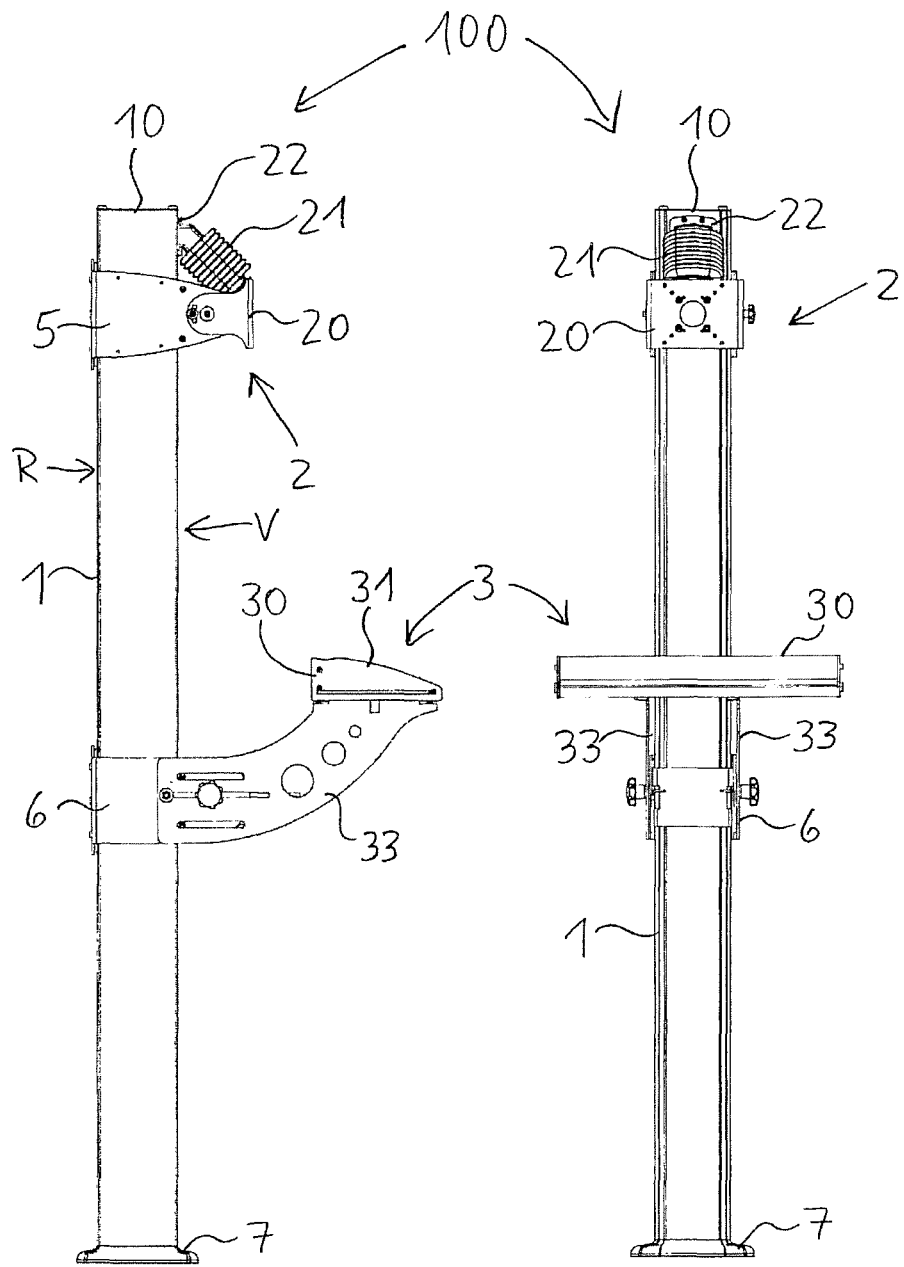
Figure 12:
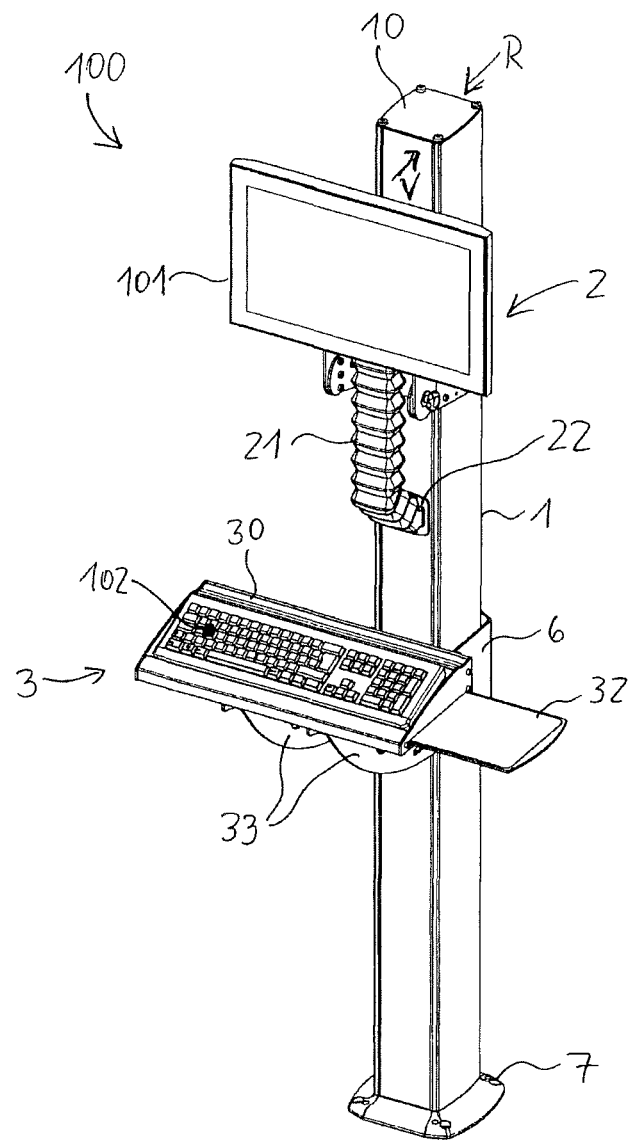
Figures 13, 14:
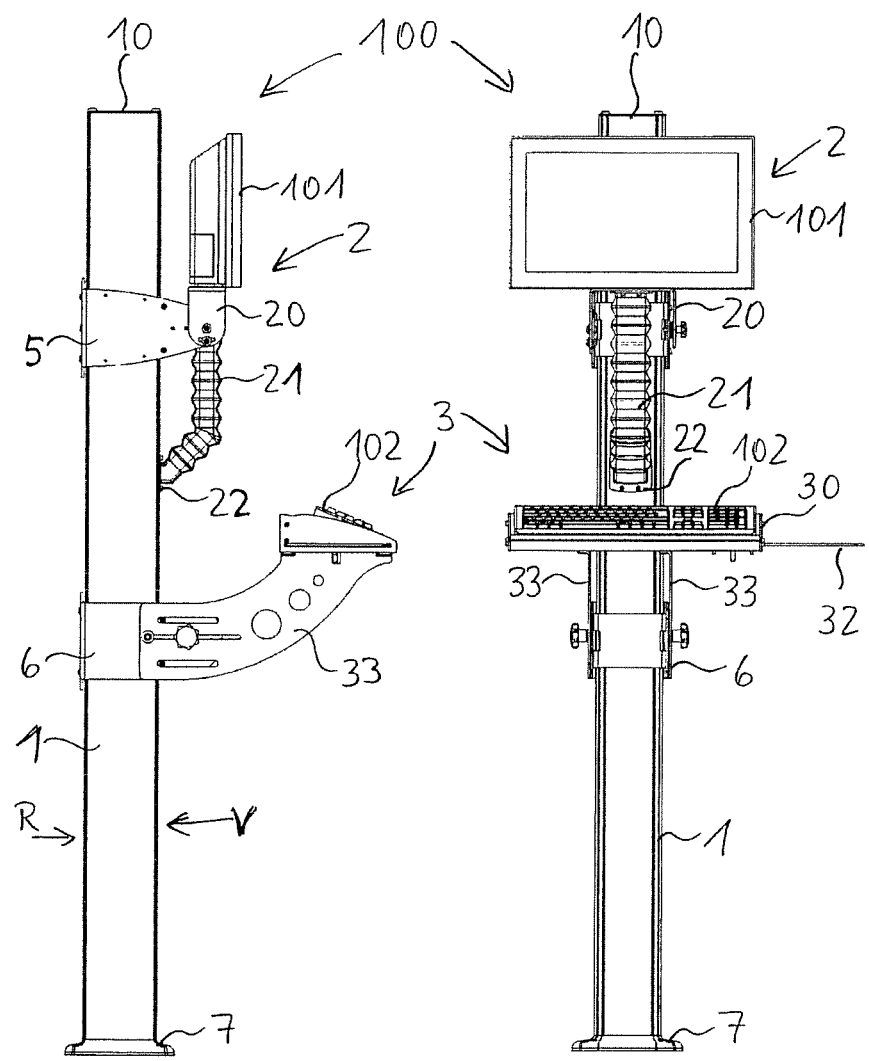
Figure 15:
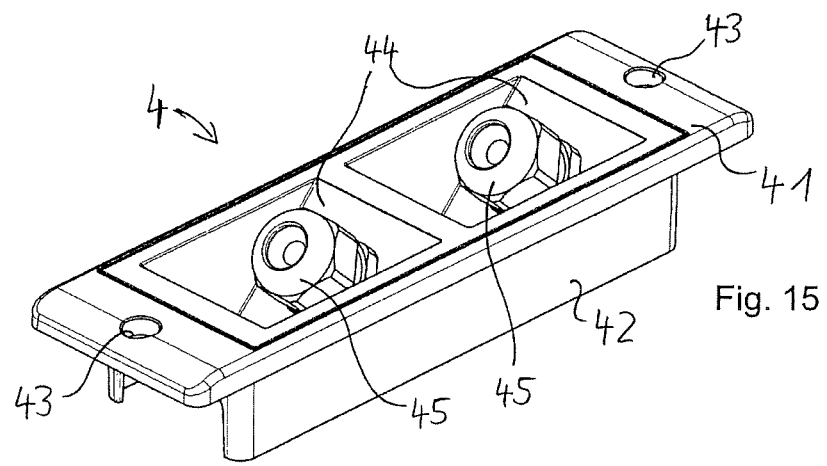
Figure 16:
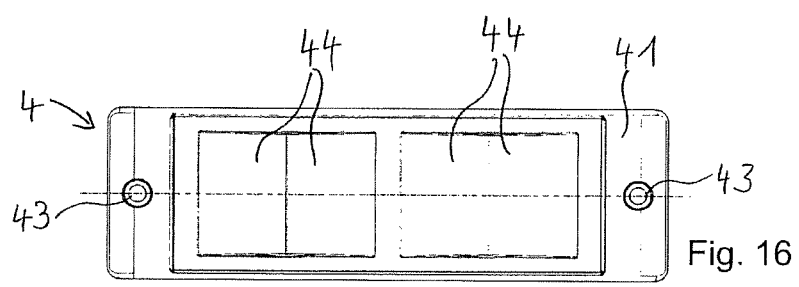
Figure 17:
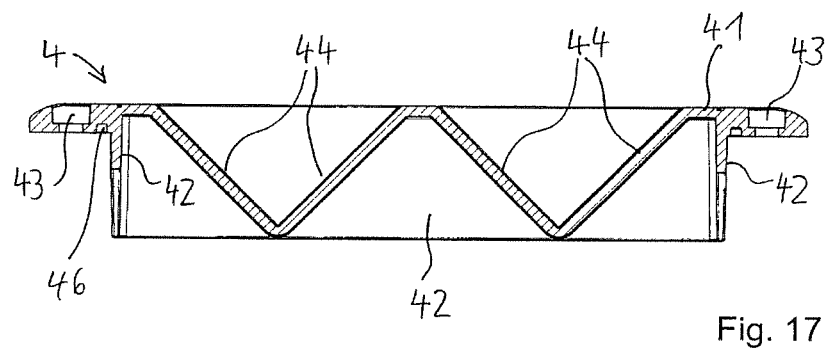
Figure 18:
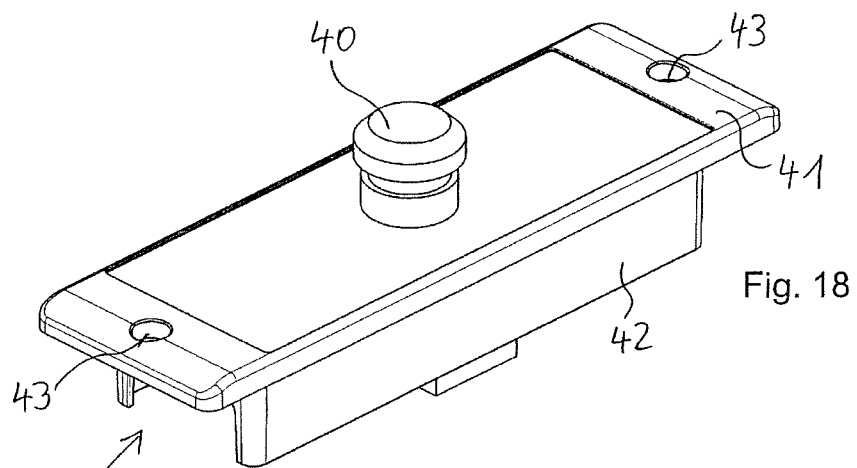
Figure 19:
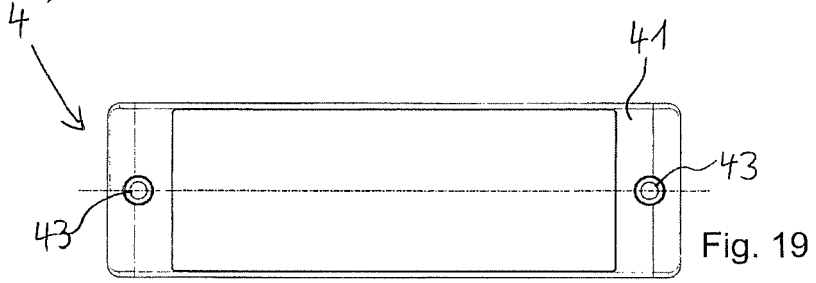
Figure 20:
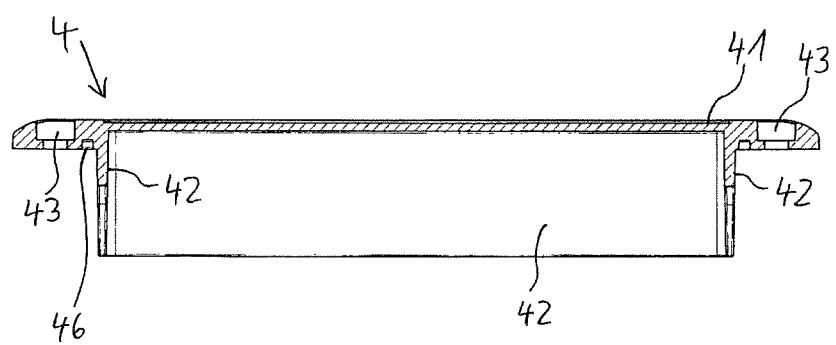
Figure 21:
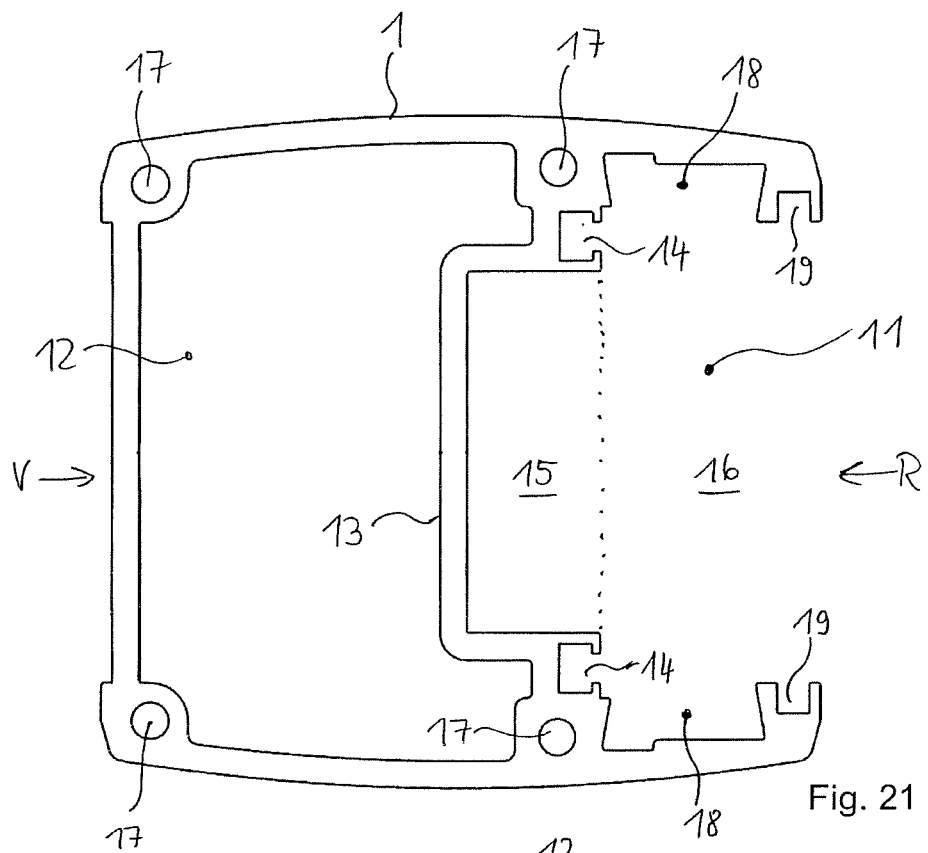
Figure 22:
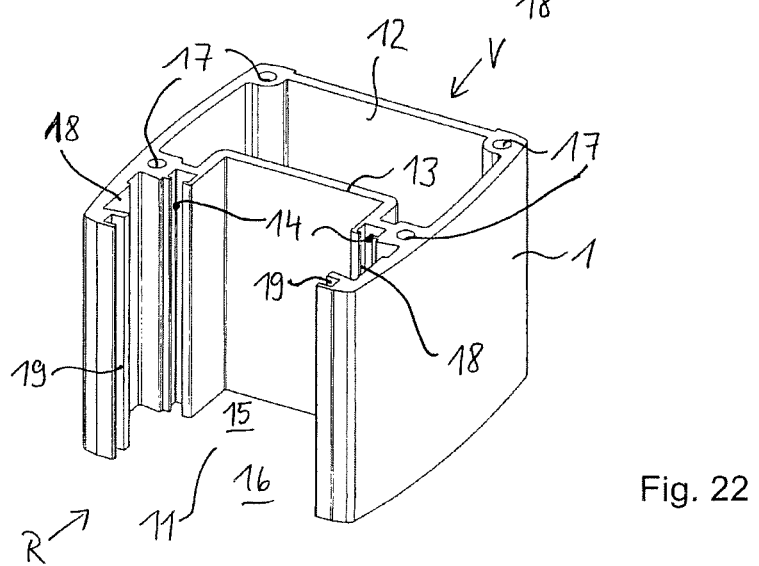
Figure 23:
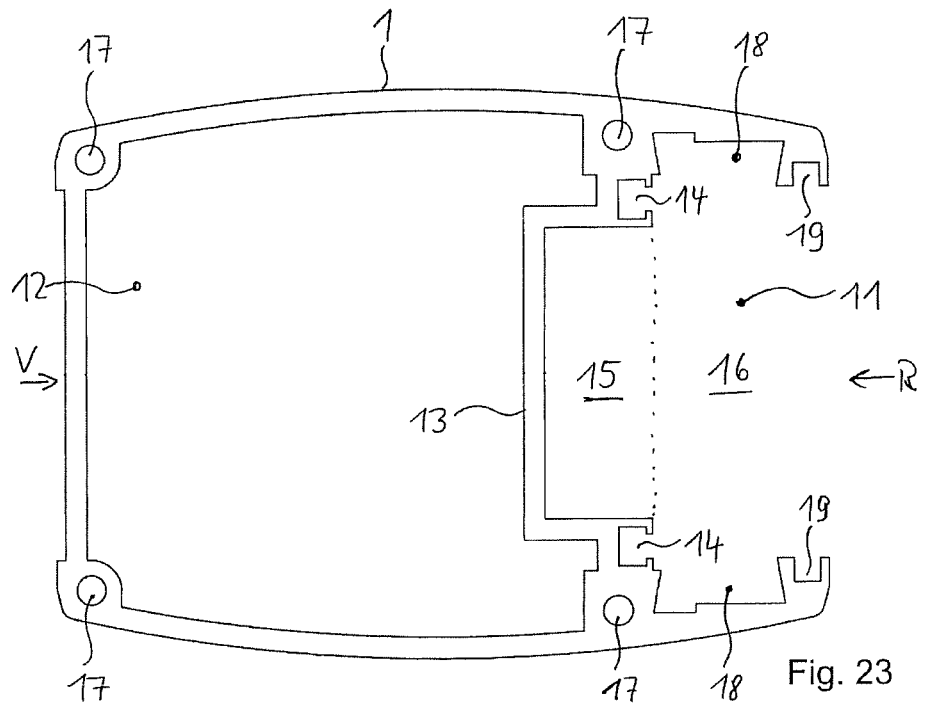
Figure 24:
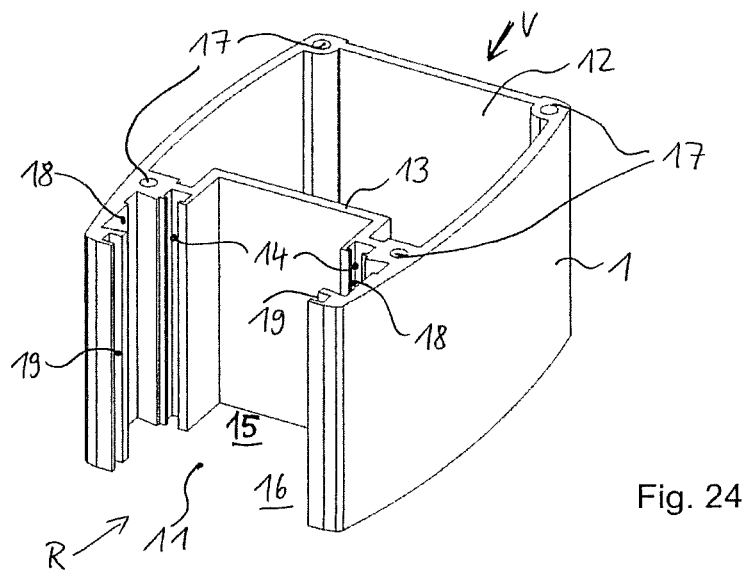
Figure 25:
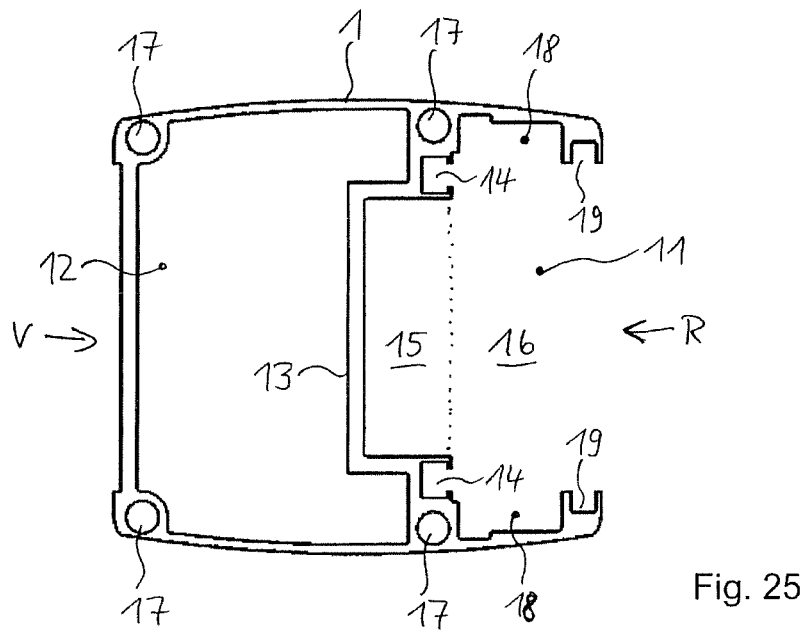
Figure 26:
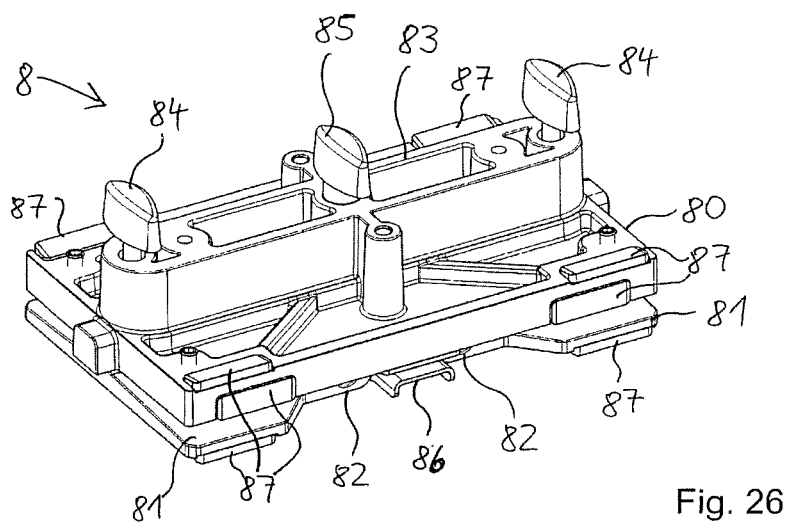
Figure 27:
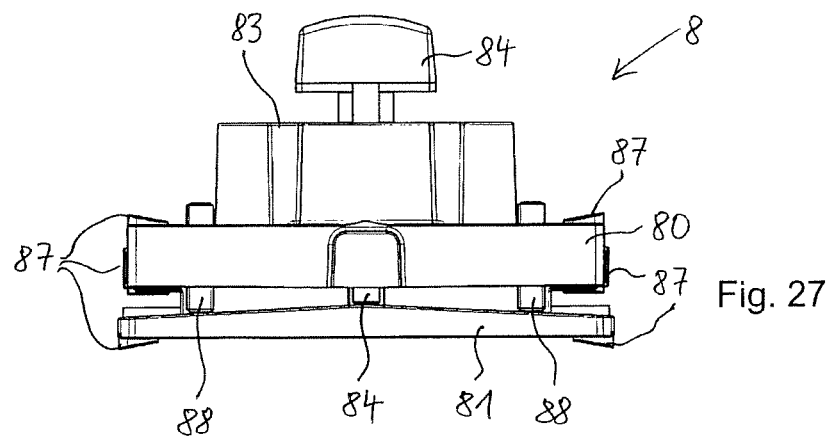
Figure 28:
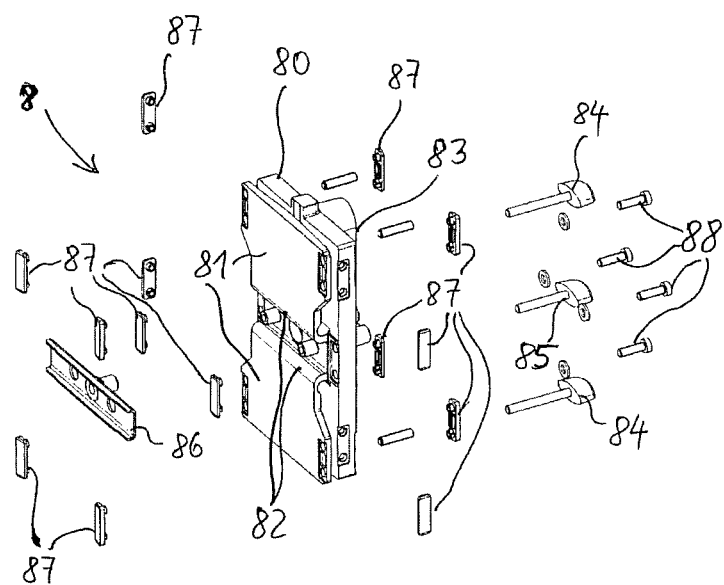
Figure 29:
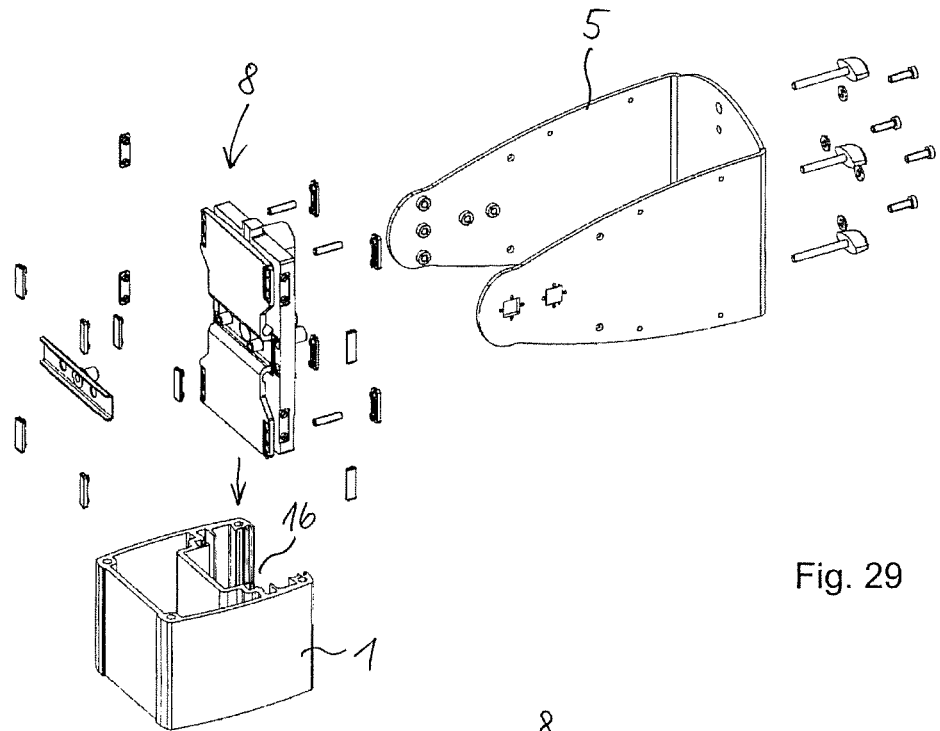
Figure 30:
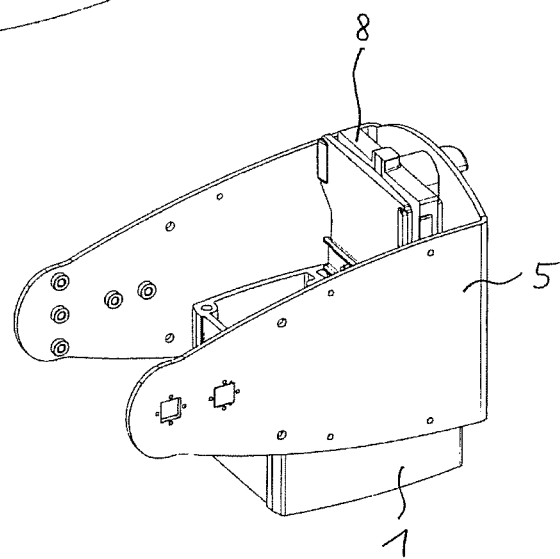
Figure 31:
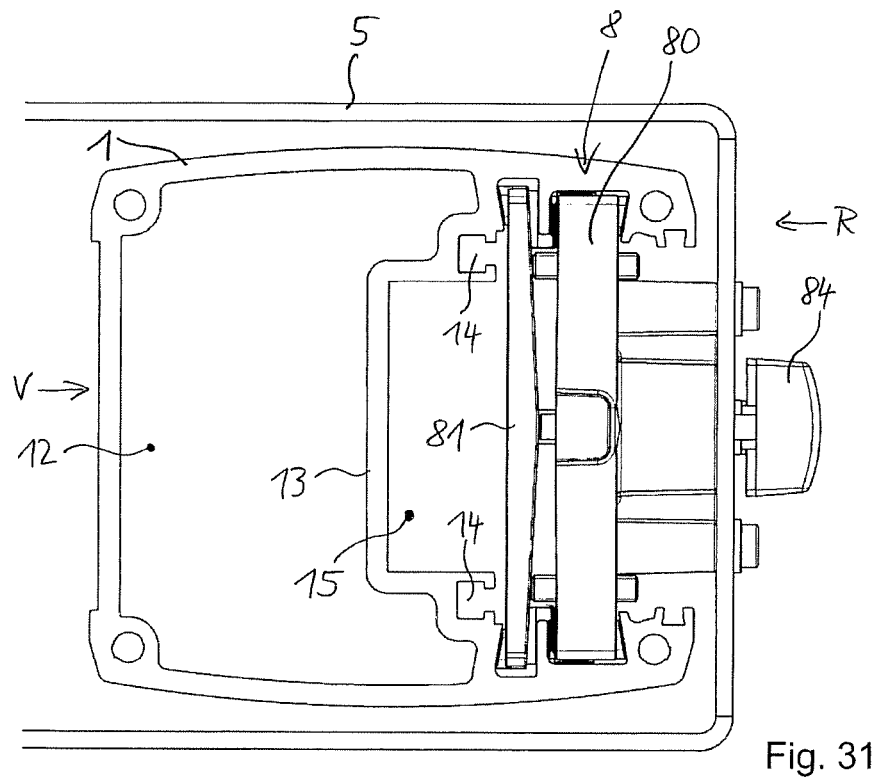
Figure 32:
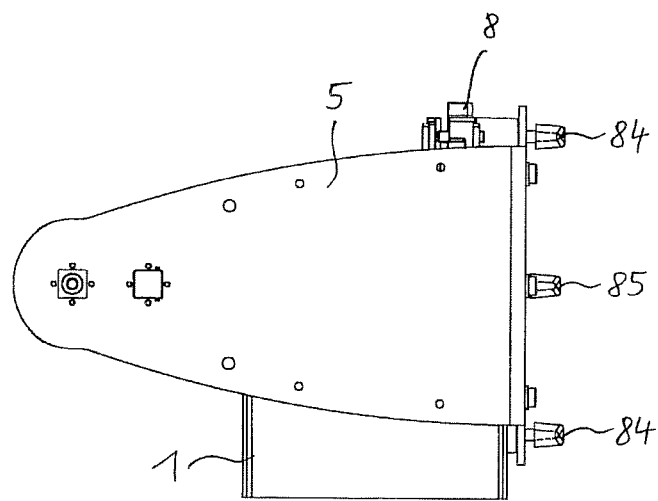
Figure 33:
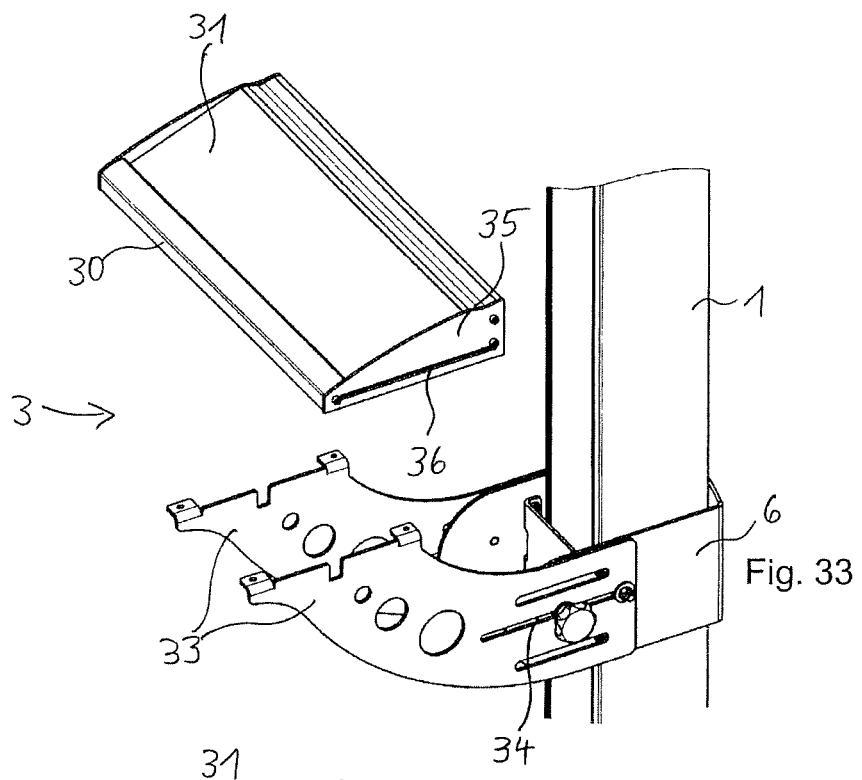
Figure 34:
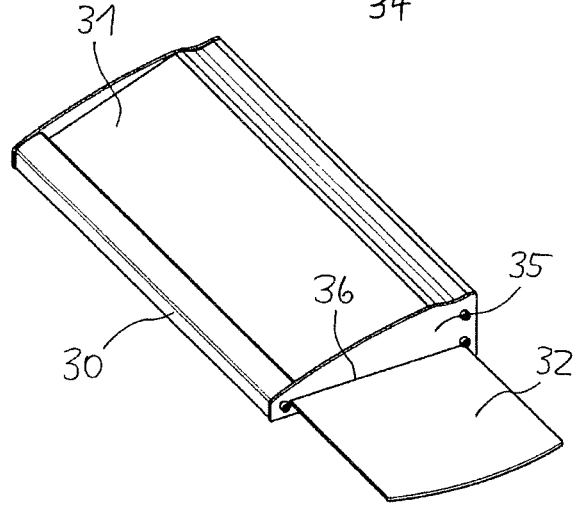
Figure 41:
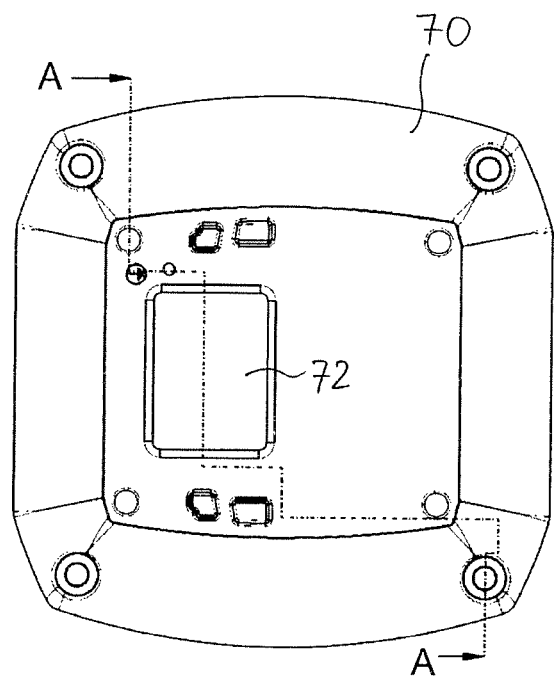
Figure 42:
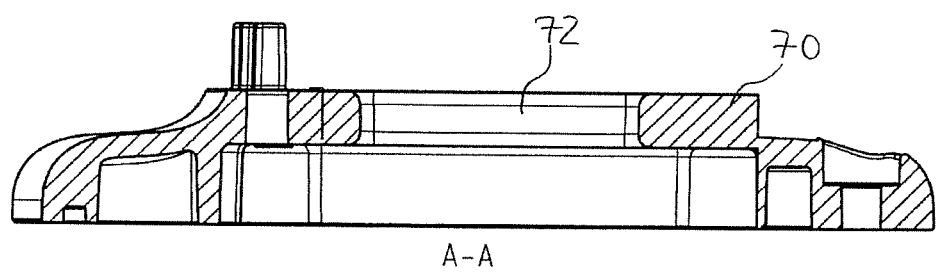
Figure 43:
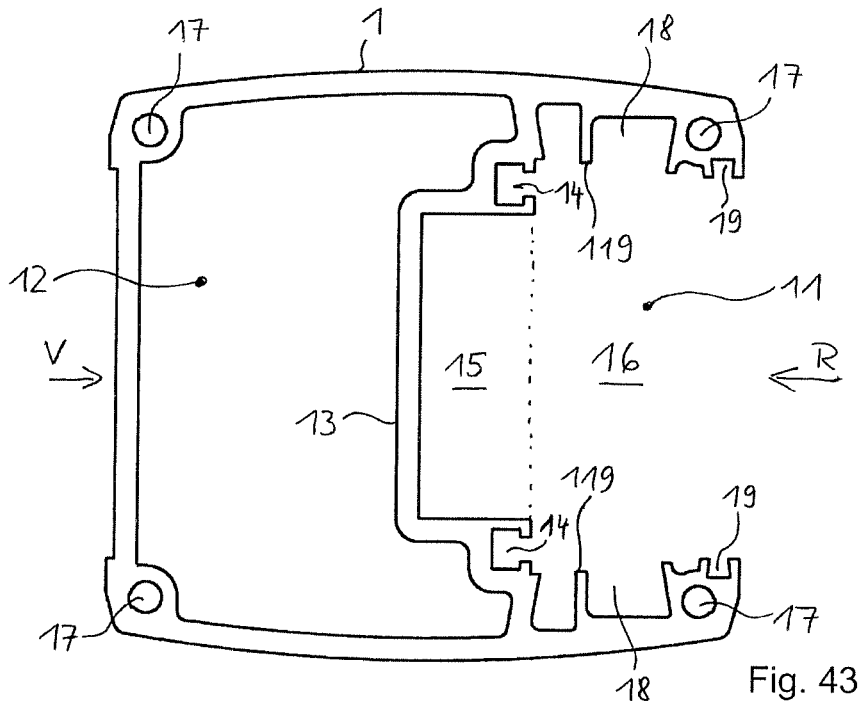
Figure 44:
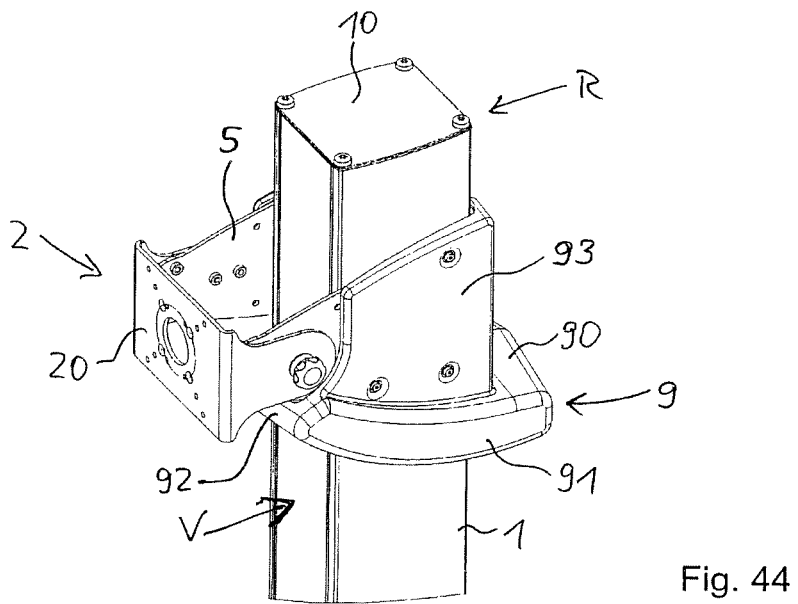
Figure 45:
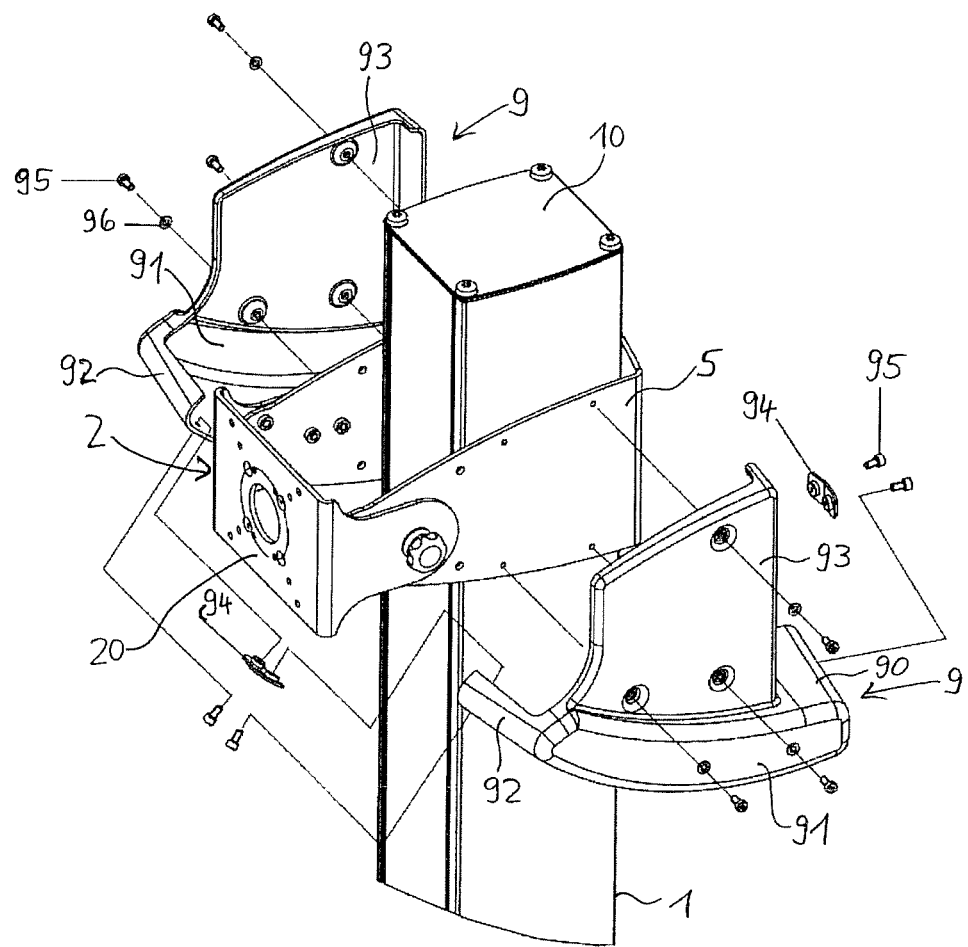
Figure 46:
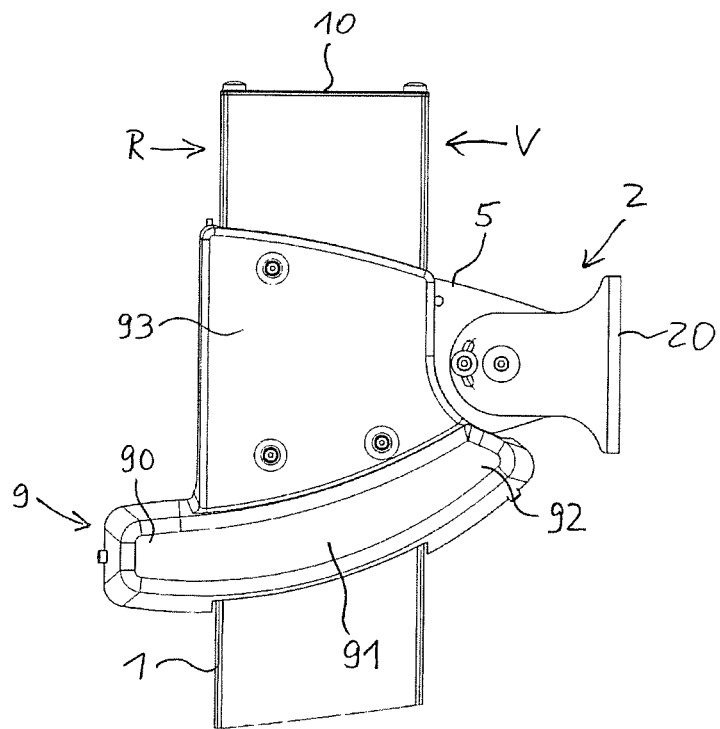
Figure 47:
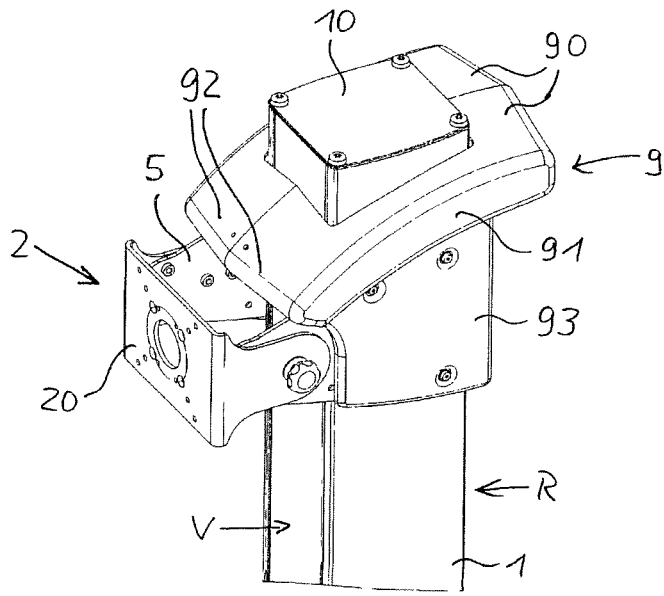

FIGS. 2 to 4 show a detailed view of the support column system in the region of the first support installation, in various views; and FIGS. 5 to 7 show detailed views of the support column system in an alternative embodiment in the region of the first support installation, in various views; and FIG. 8 shows the support column system according to FIG. 1 in a side view; and FIG. 9 shows the support column system according to FIG. 1 in a view from the rear side; and FIG. 10 shows a support column system in a side view in an embodiment comparable to that of FIG. 8, but having a modification in the region of the first support installation; and FIG. 11 shows the support column system according to FIG. 10 in a view from the front side; and FIG. 12 shows a support column system equipped with a computer installation, in a perspective illustration; and FIG. 13 shows the support column system according to FIG. 12 in a side view; and FIG. 14 shows the support column system according to FIG. 12 in a view from the front side; and FIGS. 15 to 17 show various views of a first functional cover plate; and FIGS. 18 to 20 show various views of a second functional cover plate; and FIG. 21 shows a cross section of a first embodiment of a support column; and FIG. 22 shows a fraction of the support column according to FIG. 21 in a perspective illustration; and FIG. 23 shows a cross section of a second embodiment of a support column; and FIG. 24 shows a fraction of the support column according to FIG. 23 in a perspective illustration; and FIG. 25 shows a cross section of a third embodiment of a support column; and FIG. 26 shows a slider in a perspective illustration; and FIG. 27 shows the slider according to FIG. 26 in a side view; and FIG. 28 shows the slider according to FIG. 26 in an exploded illustration; and FIG. 29 shows the slider as illustrated in FIG. 28, together with the first mounting and a fragment of the support column; and FIG. 30 shows the elements according to FIG. 29 in the assembled state, in a perspective illustration; and FIG. 31 shows the elements according to FIG. 30 in a view from above; and FIG. 32 shows the elements according to FIG. 30 in a side view; and FIG. 33 shows a second mounting, attached to the support column, and a second support installation, in a perspective illustration; and FIG. 34 shows a further embodiment of the second support installation in a perspective illustration; and FIG. 35 shows a first embodiment of a vertical fastening means of the support column, in a perspective illustration; and FIG. 36 shows a second embodiment of a vertical fastening means of a support column, in a perspective illustration; and FIG. 37 shows the first embodiment of the vertical fastening means in a perspective view onto the fastening side to the support column; and FIG. 38 shows the first embodiment of the vertical fastening means in a perspective view onto that side that faces away from the fastening side; and FIG. 39 shows the second embodiment of the vertical fastening means in a perspective view onto the fastening side to the support column; and FIG. 40 shows the second embodiment of the vertical fastening means in a perspective view onto that side that faces away from the fastening side; and FIG. 41 shows the first embodiment of the vertical fastening means in a plan view; and FIG. 42 shows a cross section along the section line A-A through the first embodiment of the vertical fastening means; and FIG. 43 shows a cross section of a fourth embodiment of a support column; and FIG. 44 shows the upper region of a support column having a cable routing installation, in a perspective view; and FIG. 45 shows the parts according to FIG. 44 in an exploded illustration; and FIG. 46 shows the upper portion of the support column according to FIG. 44, in a side view; and FIG. 47 shows a further variant of attaching a cable routing installation, in an illustration comparable to FIG. 44.

In the figures, same reference signs are used for mutually equivalent elements.

The support column system 100 illustrated in FIG. 1 has a support column 1 which is fastened to the floor by means of a vertical fastening means 7 in the form of a non-rotatable foot that is disposed on the lower end of the support column 1. The support column 1 at the upper end is closed off by a terminal plate 10. A first support installation 2 for supporting the at least one visual output device of the computer installation is fastened to the support column 1 by way of a first mounting 5. Somewhat further below, a second support installation 3 for supporting the at least one manual input device of the computer installation is fastened to the support column 1 by way of a second mounting 6. The second support installation 3 can be configured in the form of a keyboard support 30 which has a mousepad 32 that is deployable and stowable laterally from the keyboard support 30. The keyboard support 30 can have a bearing face 31, that faces the operator in an oblique manner, for placing a manual input device that is configured in the form of a computer keyboard. The keyboard support 30 is connected to the second mounting 6 by way of connection elements 33. The first support installation 2 can have a mounting plate 20 which by way of an articulated assembly is fastened in a pivotable manner to the first mounting 5, for example, a visual output device that is configured in the form of a display screen being able to be fastened to said mounting plate 20. On account of the pivotability, the inclination of the display screen toward the user can be adjusted. For the adjustment of the inclination, the articulated assembly can have a latching disk such that the adjustment of the inclination can be carried out in specific latching steps.

As can be seen, the first support installation 2 and the second support installation 3 point toward the same side of the support column 1 that forms the front side V of the support column 1. That side that faces away from the front side V is the rear side R of the support column 1.

It can furthermore be seen that a bellows 21 is fastened to the front side V of the support column 1. The function and the fastening of said bellows 21 will be explained in more detail hereunder.

A functional cover plate 4 is furthermore attached to the front side V. Two operating elements 40, for example in the form of buttons, are disposed on the functional cover plate 4.

FIGS. 2 to 4 show the support column system 100 according to FIG. 1, having an alternative design embodiment in the region of the first support installation 2 and of the bellows 21. FIG. 2 herein shows the support column 1 from the front side V, FIG. 3 in the side view, and FIG. 4 in a perspective view. It can be seen that the bellows 21 is now somewhat stretched. Said bellows 21 at the lower end thereof is fastened to a cut-out of the front side V of the support column 1 by way of a flange plate 22. The bellows 21 on the upper side is screw-fitted to the mounting plate 20 by way of a sleeve 23. The sleeve 23 in this embodiment is disposed within the region that is surrounded by the angle mounting plate 20. On account of the construction as described, having the bellows 21, electrical lines can be routed in a sealed manner from the interior of the support column 1 to the visual output device that is fastened to the first support installation 2.

FIGS. 5 to 7 show a fragment of the upper part of the support column 1 on which the first support installation 2 is disposed, comparable to that of FIGS. 2 to 4. FIG. 5 again shows a view from the front side V, FIG. 6 a side view, FIG. 7 a perspective view. By contrast to the embodiment of FIGS. 2 to 4, the sleeve 23 in this embodiment is disposed outside the region that is disposed by the angled mounting plate 20. An adaptation that is in each case suited to the elements of the computer installation used, in particular to the visual output device, can be performed by the user by selecting the respective most favorable configuration of the variants according to FIG. 2 to 4, or 5 to 7.

FIGS. 8 to 9 once again show the support column system 100 according to FIG. 1, once in a side view (FIG. 8) and once in a view from the rear side R (FIG. 9). It can be seen in particular that the support column 1 is open toward the rear side R such that a view into the open rear chamber 11 of the support column 1 is possible. To the extent that the support column 1 is to be covered from the rear side R at least in visual terms and in terms of the influence of rough dust, flexible closure strips 110, for example in the form of bristle strips, can be disposed there.

It can furthermore be seen in FIG. 9 that one or a plurality of functional cover plates 4 can be disposed on the support column 1 also from the rear side R, for example in order for cable conduits from the open chamber 11 into the closed chamber of the support column 1 to be implemented.

The first mounting 5 and the second mounting 6 can be fastened in the interior of the rear open chamber 11 of the support column 1 by way of corresponding coupling means having fixing elements, for example by way of suitably formed fastening plates. Alternatively, a height-adjustable fixation, for example by way of a slider as will be explained in more detail hereunder, can also be present.

An alternative type of fastening the bellows 21 to the support column 1 is illustrated by means of FIGS. 10 to 11. It can be seen that the fastening location of the bellows 21 to the support column 1 does not mandatorily have to be disposed below the first support installation 2 but can also be disposed above the first support installation 2. In this case, the bellows 21 is fastened to the support column 1 in the upper region thereof by way of the flange plate 22.

The bellows 21 is an optional element of the support column system 100. In other words, the support column system 100 can also be implemented without the bellows and accordingly without the cut-out in the support column that is required therefor. For example, connection cables for parts of the computer installation can be routed from the rear side of the support column, emanating from the open rear chamber 11, around the support column to the respective part of the computer installation.

FIGS. 12 to 14 show the support column system 100 according to FIG. 1, having a visual output device 101 that is fastened to the first support installation 2, and a manual input device 102 that is disposed on the second support installation 3, in various illustrations.

As has been explained, one or a plurality of cut-outs can be located on the support column 1 on the front side V or the rear side R, so as to fasten respective functional cover plates 4 thereto. FIGS. 15 to 17 show a first embodiment of a functional cover plate 4 which serves mainly for routing cables. The functional cover plate 4 has a main surface 41 which is to be aligned toward the outside of the support column 1 and which, when attached to the support column 1, runs so as to be substantially parallel with the external surface of the support column 1. The main surface 41 is interrupted by a plurality of conduit walls 44 that are disposed in an oblique, in this case a staggered, manner. Cut-outs for routing cables can be disposed as required on the conduit walls 44 by the user. It is advantageous herein for sealed cable screw fittings 45 for routing cables to be attached to the conduit walls 44, in order for the cables to be routed in a sealed manner through a wall of the support column 1.

The functional cover plate 4 has a rear fastening frame 42 which is disposed on that side of the functional cover plate 4 that faces away from the main surface 41. The fastening frame 42, when the functional cover plate 4 is disposed on the support column 1, is disposed substantially in the interior of the support column 1. The functional cover plate in the region of the fastening frame 42 can have an encircling groove 46 for receiving a seal. Furthermore, screw-fitting bores 43 are disposed in the end regions of the functional cover plate 4. In this way, the functional cover plate 4 can be fastened to the wall of the support column 1 from the outside by means of screws.

FIGS. 18 to 20, in views that are comparable to those of FIGS. 15 to 17, shows a further embodiment of a functional cover plate 4. The main surface 41 in this case is configured in the form of a substantially planar assembly face of the functional cover plate 4. This embodiment of the functional cover plate 4 is particularly suitable for attaching visual display elements, for example lights, or manual operating elements such as buttons 40 or switches. The functional cover plates 4 in the various embodiments thereof can be selected by the user according to requirement and be fastened to the support column 1, and should the requirements change, also be replaced.

A first embodiment of a profile of the support column 1 will be explained by means of FIGS. 21 to 22. One front closed chamber 12 and one rear open chamber 11 is present in the case of all embodiments. The rear open chamber 11 is separated from the front closed chamber 12 by way of an internal separating wall 13. On account of the front chamber 12 being configured as a closed chamber, a high degree of ruggedness of the support column 1 paired with high torsional rigidity is implemented by the surrounding external walls of the support column 1 in conjunction with the separating wall 13. On account of the rear chamber 11 being configured as an open chamber, there are potentials for fitting elements that are to be fastened to the support column and for routing cables. In particular, the mountings 5, 6 can be fastened thereto.

Fixing installations 14 which are configured in the form of grooves that run in the longitudinal direction of the support column 1 are present within the rear chamber 11. The first mounting 5 and the second mounting 6 can be fastened to the support column 1 by way of the fixing installations 14, for example. The fixing installations 14 can also be utilized for fastening further elements. Accordingly, a coupling element that for coupling the first or the second mounting is fastened to the fixing installations 14 in the rear chamber 11 extends only in a part-region of the rear chamber 11, said part-region hereunder to be referred to as the receptacle space 16 for such a coupling element. On account thereof, the rear chamber 11 is split into the receptacle space 16 and a further space 15, as is indicated by the punctiform line. The further space 15 can be utilized as a cable receptacle space for receiving cables that are installed in the rear chamber 11.

If fastening of the first support installation 2 or of the second support installation 3 to the support column 1 is not be performed by way of a fixedly installed coupling element but in a height-adjustable manner by way of a coupling element that is fastenable in a longitudinally displaceable manner, such as a slider, for example, guide rails 18, disposed in the rear chamber 11, for guiding such a coupling element can be utilized. In the embodiment according to FIG. 21, these guide rails 18 are configured in a dovetail shape, so as to guarantee reliable guiding of the coupling element.

Toward the outside, the rear chamber 11 moreover has receptacle grooves 19 for receiving the flexible closure strips 110. Furthermore, the profile of the support strip 1 has hollow chambers 17, running in the longitudinal direction and having a circular cross section. These hollow chambers 17 can be utilized, for example, for fastening the upper terminal plate 10 to the support strip 1, or for fastening the vertical fastening means 7.

FIGS. 23 to 24 show a second embodiment of a profile of the support column 1, having a front chamber 12 that is extended in length. The profile in the region of the rear chamber 11 is configured in a manner comparable to that profile that has been described by means of FIGS. 21 to 22.

FIG. 25 shows a further embodiment of a profile of the support column 1, which in the region of the front chamber 12 corresponds substantially to the embodiment of FIGS. 21 to 22, but has points of differentiation in the region of the rear chamber 11. The guide rails 18 in the case of the embodiment of FIG. 25 are thus configured having side walls that run in parallel, that is to say that are not dovetail-shaped.

FIG. 43 shows a further embodiment of a profile of the support column 1, which differs from the embodiment of FIG. 22 by way of additional webs 119 that protrude into the receptacle space 16. The webs 119 are disposed in the region of the guide rails 18. The webs 119 serve for additionally guiding and clamping the slider 8 within the guide rails 18.

As has been mentioned, a slider can be guided in a sliding manner within the receptacle space 16 of the profile of the support column. This will be explained in more detail hereunder by means of FIGS. 26 to 32. First, FIG. 26 shows a slider 8 in the assembled state. The slider 8 has a main body 80, a protruding fastening region 83 being molded to that side of said main body 80 that points toward the rear side R of the support column, the first or the second mounting 5, 6 being able to be fastened to said fastening region 83. A central fastening screw 85 is provided for fastening the mounting to the slider. Further screws 84 which function as clamping screws of a clamp-fixing mechanism of the slider 8 are present on the upper and the lower end of the slider 8. To this end, the slider 8 on that side of the main body 80 that faces away from the fastening region 83 has pivotable clamping elements 81 which are connected to the main body 80 in an articulated manner (by way of joints 82). The clamping elements 81 are connected to the main body 80 by way of materially integral joints 82, for example. If a clamping screw 84 that is assigned to the respective clamping element 81 is tightened, said clamping screw 84 presses against the respective clamping element 81 and expands the latter somewhat away from the main body 80 such that the slider 8 can be fixedly clamped within the guide rails 18. In order for a basic setting of the clamping elements 81 that is suitable for sliding along the guide rails 18 with a minor effort in terms of force to be guaranteed, adjustable zero-position elements 88, for example in the form of screws by way of which a zero position (neutral position) of the clamping elements 81 can be pre-set, are present.

The slider 8, in particular the main body 80 thereof and the clamping elements 81, can be made of metal or plastics, for example. In order for favorable sliding properties to be guaranteed within the guide rails 18, in a manner independent of the resulting pairing of materials of the slider 8 and the material of the support column 1, sliding elements 87 can be clipped to the slider 8 at various external positions, or be fastened to the latter in another way. The sliding elements 87 can be composed of Teflon, for example, or of another suitable low-friction material.

Furthermore to be seen is a rear holding element 86 which serves as the counter bearing for the holding screw 85 and a mounting 5, 6 that is fastened thereto and which is disposed on the side of the clamping element 81 on a roughly central location on the slider. The first or the second mounting 5, 6 is thus fastened to the fastening region 83 by way of the holding screw 85. The holding screw 85 herein is screw-fitted into a thread of the rear holding element 86.

As is shown in FIGS. 30 to 32, the pre-assembled unit composed of the mounting 5 and the slider 8 can be introduced into the rear chamber 11 and in particular into the guide rails 18 from above or below, but in any case from one open side of the support column 1. In order for the slider 8 to be fixed in a desired vertical position, the two clamping screws 84 are tightened. If the vertical position is to be modified again, only the clamping screws 84 have to be released for the vertical position to be modified. Thereafter, renewed clamp-fixing is performed by tightening the clamping screws 84.

In order for cables that are routed within the cable receptacle space 15 in the longitudinal direction of the support column 1 to be held reliably in this cable receptacle space 15 and in particular in order to avoid any conflicts in a readjustment of the slider 8, transversely running cable holding plates can be disposed in suitable locations on the fixing installations 14, for example by way of spring nuts that are inserted into the latter.

FIGS. 33 to 34, in an enlarged illustration, show the region of the second support installation 3 of the support column 1. It can be seen in particular that the connection elements 33 can be adjustable for length by way of longitudinal slots 34, that is to say that the spacing of the keyboard support 30 from the support column 1 can be adapted to requirements. Additionally, a cover flap can be fastened to the keyboard support 30, the former being able to be folded closed for covering the keyboard. In this way, the keyboard, when not being activated, is protected from environmental influences. In particular, the keyboard support 30 can have a central profiled extrusion having the bearing face 31, said central profiled extrusion being laterally closed off by closure plates 35. A slot 36 for routing the mousepad 32 can be disposed in one or in both lateral closure plates 35.

FIG. 35 shows a stationary foot 70 of the support column system 100 as a vertical fastening means 7. Any subsequent adjustment of the support column 1 is impossible in the case of the stationary foot 70 which is screw-fitted to the floor by way of fastening bores. Therefore, a rotatable foot 70 according to FIG. 36 can be alternatively employed. Said rotatable foot 70 disposes of a rotary joint 71 which enables rotation of the support column 1 about the longitudinal axis of the latter, this is to say about the vertical axis.

Both embodiments of the foot 70 have a cut-out 72 which serves for routing cables. The cables can be further installed in a cable duct or in the floor, for example.

The support column 1 by way of the vertical fastening means 7 can also be fastened onto a trolley such that a mobile support column system 100 is implemented. The vertical fastening means 7 can also be fastened to the upper side of the support column instead of the terminal plate 10. In this way, the support column 1 can be fastened to the ceiling of a room or to a support beam.

The support column system 100 according to the invention can be complemented by an additional component in the form of a cable routing installation 9, as is shown in FIGS. 44 to 47. The cable routing installation 9 serves for routing cables from the rear side R of the support column 1 to the front side V, for example cable of the visual output device, of the manual input device, or other cables of the computer installation. The cables can thus be routed within the support column 1, in particular in the receptacle space 16, and can be routed in a visually appealing manner out of the support column 1 toward the front side V to the respective part of the computer installation. The cable routing installation 9 herein forms a cable duct. The cables herein are largely encapsulated, at least in visual terms.

The cable routing installation 9 can be composed of two parts that are configured in a mutually mirror-symmetrical manner and which are placed onto the support column 1 from left to right, or onto the first support installation 2 or the second support installation 3, respectively, and are connected to one another. Each of the mirror-symmetrical parts can have a rear cable routing portion 90, a lateral cable routing portion 91, and a front-side cable-routing portion 92, said portions being disposed in this sequence such that cables can be routed continuously from the rear cable routing portion 90 through the lateral cable routing portion 91 toward the front-side cable-routing portion 92.

In order for the respective part of the cable routing installation to be fastened to the support column 1 or to the first or the second support installation 2, 3, the respective part can have a fastening face 93 in which through bores for screws to pass through are present, for example. FIG. 44 shows the cable routing installation 9 that has been described above attached to the first support installation 2, specifically in a first fastening position in which the cable routing portions 90, 91, 92 are disposed below the fastening face 93. As becomes evident in particular from the illustration in FIG. 45, the respective halves of the cable routing installation 9 can be coupled to one another by way of connection pieces 94, for example in the form of connection plates, such that the interfaces of said halves bear on one another in a flush manner. The connection pieces 94 can be fastened to the first support installation 2 by way of screws 95, for example, in conjunction with washer 96, for example. The connection pieces 94 can be fastened to the parts of the cable routing installation 9 by way of screws 95.

FIG. 46 shows the assembly according to FIG. 44 in a side view. The curved profile of the lateral cable routing portion 91 can be seen in particular.

FIG. 47 shows that the cable routing installation 9 can also be fitted in a second fastening position in such a manner that the fastening face 93 is disposed below the cable routing portions 90, 91, 92.

The invention claimed is:

1. A support column system for supporting at least one computer installation, comprising:
   a) at least one elongate support column arranged for vertical fitting;
   b) at least one vertical fastening means arranged for fastening the at least one elongate support column vertically to a floor, a ceiling, or a wall of a room, or for fastening the at least one elongate support column to a roller platform;
   c) at least one first support installation fastened to the at least one elongate support column for supporting at least one visual output device of the computer installation;
   d) at least one second support installation fastened to the at least one elongate support column for supporting at least one manual input device of the computer installation;
   wherein the at least one elongate support column has at least one cut-out in an externally accessible wall,
   wherein at least one functional element is routed through the at least one cut-out, wherein the at least one functional cover plate is fastened in or on the cut-out and covers the at least one cut-out, and
   wherein the at least one functional element passes through a sealed fitting associated with the at least one functional cover plate and is routed through the at least one cut-out in a sealed manner,
   wherein the at least one functional cover plate has at least one conduit wall running obliquely to the longitudinal axis of the at least one elongate support column for routing a cable.

2. The support column system according to claim 1 wherein the at least one functional cover plate is disposed on a front side or a rear side of the at least one elongate support column.

3. The support column system according to claim 1 wherein the at least one functional cover plate has at least one conduit wall running obliquely to the longitudinal axis of the at least one elongate support column for routing a cable.

4. The support column system according to claim 1 wherein the at least one elongate support column is composed entirely or largely of metal.

5. The support column system according to claim 1 wherein the at least one functional cover plate is composed entirely or largely of plastics.

6. The support column system according to claim 1 wherein one or more of the first support installation and the second support installation has at least one document stand.

7. The support column system according to claim 1 wherein the at least one functional element on the functional cover plate is or includes an emergency shut-off activation element of the computer installation or of a system that is connected to the computer installation.

8. The support column system according to claim 1 further comprising a signal lamp fastened to the at least one elongate support column.

9. The support column system according to claim 1 further comprising a cable routing installation which has a plurality of cable routing portions which reach laterally around the at least one elongate support column from a rear side to a front side of the at least one elongate support column.

10. The support column system of claim 1 wherein the at least one conduit wall includes a plurality of conduit walls that are disposed in an oblique staggered manner.

11. A support column system for supporting at least one computer installation, comprising:
at least one elongate support column arranged for vertical fitting;
at least one vertical fastening means arranged for fastening the at least one elongate support column vertically to a floor, a ceiling, or a wall of a room, or for fastening the at least one elongate support column to a roller platform;
at least one first support installation fastened to the at least one elongate support column for supporting at least one visual output device of the computer installation;
at least one second support installation fastened to the at least one elongate support column for supporting at least one manual input device of the computer installation;
wherein the at least one elongate support column has at least one cut-out in an externally accessible wall,
wherein at least one functional element is routed through the at least one cut-out, wherein the at least one functional cover plate is fastened in or on the cut-out and covers the at least one cut-out, and
wherein the at least one functional element passes through a sealed fitting associated with the at least one functional cover plate and is routed through the at least one cut-out in a sealed manner,
wherein the at least one functional cover plate has a fastening frame which in terms of dimensions thereof is adapted to dimensions of the at least one cut-out.

12. The support column system according to claim 11 wherein the at least one functional cover plate is composed entirely or largely of plastics.

13. The support column system according to claim 11 wherein the at least one functional element on the functional cover plate is or includes an emergency shut-off activation element of the computer installation or of a system that is connected to the computer installation.

14. The support column system according to claim 11 further comprising a deployable and stowable mousepad integrated in the at least one second support installation.

15. The support column system according to claim 11 further comprising a cable routing installation which has a plurality of cable routing portions which reach laterally around the at least one elongate support column from a rear side to a front side of the at least one elongate support column.

16. A support column system for supporting at least one computer installation, comprising:
at least one elongate support column arranged for vertical fitting;
at least one vertical fastening means arranged for fastening the at least one elongate support column vertically to a floor, a ceiling, or a wall of a room, or for fastening the at least one elongate support column to a roller platform;
at least one first support installation fastened to the at least one elongate support column for supporting at least one visual output device of the computer installation;
at least one second support installation fastened to the at least one elongate support column for supporting at least one manual input device of the computer installation;
wherein the at least one elongate support column has at least one cut-out in an externally accessible wall,
wherein at least one functional element is routed through the at least one cut-out, wherein the at least one functional cover plate is fastened in or on the cut-out and covers the at least one cut-out, and
wherein the at least one functional element passes through a sealed fitting associated with the at least one functional cover plate and is routed through the at least one cut-out in a sealed manner,
wherein the at least one second support installation has a profiled extrusion having a bearing face for the at least one manual input device of the computer installation, wherein the profiled extrusion is laterally closed by closure plates.

17. The support column system according to claim 16 wherein the at least one functional cover plate is composed entirely or largely of plastics.

18. The support column system according to claim 16 wherein the at least one functional element on the functional cover plate is or includes an emergency shut-off activation element of the computer installation or of a system that is connected to the computer installation.

19. The support column system according to claim 16 further comprising a deployable and stowable mousepad integrated in the at least one second support installation.

20. The support column system according to claim 16 further comprising a cable routing installation which has a plurality of cable routing portions which reach laterally around the at least one elongate support column from a rear side to a front side of the at least one elongate support column.

21. A support column system for supporting at least one computer installation, comprising:
at least one elongate support column arranged for vertical fitting;
at least one vertical fastening means arranged for fastening the at least one elongate support column vertically to a floor, a ceiling, or a wall of a room, or for fastening the at least one elongate support column to a roller platform;
at least one first support installation fastened to the at least one elongate support column for supporting at least one visual output device of the computer installation;
at least one second support installation fastened to the at least one elongate support column for supporting at least one manual input device of the computer installation;
wherein the at least one elongate support column has at least one cut-out in an externally accessible wall,
wherein at least one functional element is routed through the at least one cut-out, wherein the at least one functional cover plate is fastened in or on the cut-out and covers the at least one cut-out, and
wherein the at least one functional element passes through a sealed fitting associated with the at least one functional cover plate and is routed through the at least one cut-out in a sealed manner, and
a deployable and stowable mousepad integrated in the at least one second support installation.

22. The support column system according to claim 21 wherein the at least one functional cover plate is composed entirely or largely of plastics.

23. The support column system according to claim 21 wherein the at least one functional element on the functional cover plate is or includes an emergency shut-off activation element of the computer installation or of a system that is connected to the computer installation.

24. The support column system according to claim 21 further comprising a cable routing installation which has a plurality of cable routing portions which reach laterally around the at least one elongate support column from a rear side to a front side of the at least one elongate support column.

25. A support column system for supporting at least one computer installation, comprising:
  at least one elongate support column arranged for vertical fitting;
  at least one vertical fastening means arranged for fastening the at least one elongate support column vertically to a floor, a ceiling, or a wall of a room, or for fastening the at least one elongate support column to a roller platform;
  at least one first support installation fastened to the at least one elongate support column for supporting at least one visual output device of the computer installation;
  at least one second support installation fastened to the at least one elongate support column for supporting at least one manual input device of the computer installation;
    wherein the at least one elongate support column has at least one cut-out in an externally accessible wall,
    wherein at least one functional element is routed through the at least one cut-out, wherein the at least one functional cover plate is fastened in or on the cut-out and covers the at least one cut-out, and
    wherein the at least one functional element passes through a sealed fitting associated with the at least one functional cover plate and is routed through the at least one cut-out in a sealed manner, and
  a bellows coupled to
    the at least one cut-out on an external wall of the at least one elongate support column, and to
  one or more of
    the at least one first support installation or the at least one second support installation or to a first or a second mounting.

26. The support column system according to claim 25 wherein the at least one functional cover plate is composed entirely or largely of plastics.

27. The support column system according to claim 25 wherein the at least one functional element on the functional cover plate is or includes an emergency shut-off activation element of the computer installation or of a system that is connected to the computer installation.

28. The support column system according to claim 25 further comprising a deployable and stowable mousepad integrated in the at least one second support installation.

29. The support column system according to claim 25 further comprising a cable routing installation which has a plurality of cable routing portions which reach laterally around the at least one elongate support column from a rear side to a front side of the at least one elongate support column.

* * * * *